US009737785B2

(12) United States Patent
Burger

(10) Patent No.: US 9,737,785 B2
(45) Date of Patent: Aug. 22, 2017

(54) SPORTING DEVICE HAVING A SLIDING BODY AND A DRIVE FOR A CIRCULATING BELT

(71) Applicant: ABP PATENT NETWORK GmbH, Windischgarsten (AT)

(72) Inventor: Hannes Burger, Windischgarsten (AT)

(73) Assignee: ABP PATENT NETWORK GmbH, Windischgarsten (AT)

( * ) Notice: Subject to any disclaimer, the term of this patent is extended or adjusted under 35 U.S.C. 154(b) by 0 days.

(21) Appl. No.: 15/301,965

(22) PCT Filed: Apr. 22, 2015

(86) PCT No.: PCT/AT2015/050097
§ 371 (c)(1),
(2) Date: Oct. 5, 2016

(87) PCT Pub. No.: WO2015/161329
PCT Pub. Date: Oct. 29, 2015

(65) Prior Publication Data
US 2017/0113119 A1 Apr. 27, 2017

(30) Foreign Application Priority Data
Apr. 23, 2014 (AT) .............................. A 50297/2014

(51) Int. Cl.
*A63C 5/08* (2006.01)
*A63C 5/035* (2006.01)
(Continued)

(52) U.S. Cl.
CPC .............. *A63C 5/085* (2013.01); *A63C 5/035* (2013.01); *B62D 51/007* (2013.01); *B62D 55/06* (2013.01);
(Continued)

(58) Field of Classification Search
CPC ...... A63C 5/085; A63C 5/035; B62D 51/007; B62D 5/06
See application file for complete search history.

(56) References Cited

U.S. PATENT DOCUMENTS 2,625,229 A   1/1953   Van Voorhees
3,710,881 A   1/1973   Thompson
(Continued)

FOREIGN PATENT DOCUMENTS

DE   23 28 987 A1   1/1975
DE   24 45 405 A1   4/1975
(Continued)

OTHER PUBLICATIONS

International Search Report of PCT/AT2015/050097, mailed Aug. 20, 2015.

*Primary Examiner* — John Walters
*Assistant Examiner* — James Triggs
(74) *Attorney, Agent, or Firm* — Collard & Roe, P.C.

(57) ABSTRACT

The invention relates to a sporting device (1), in particular a touring ski assembly. The sporting device (1) comprises a sliding body (2) on which a bottom side (3) is designed as a sliding surface (4). Furthermore, the sporting device (1) comprises a binding apparatus (6) disposed on the top face (5) of the sliding body (2) for fastening to a sporting shoe (7) of a user (8) in such a way that the fastening can be released as and when necessary, a circulating belt (13) having a first segment (14) for establishing a relative motion between the sliding body (2) and the ground (12) and a second, returning segment (15), as well as a drive apparatus (17) and at least one first deflecting apparatus (18) for the belt (13). The first segment (14) is disposed next to the bottom side (3) of the sliding body (2) and the second, returning segment (15) is disposed next to the top face (5) of the sliding body (2). At least the majority of the length (9) of the sliding body (2) is
(Continued)

Figure 1:
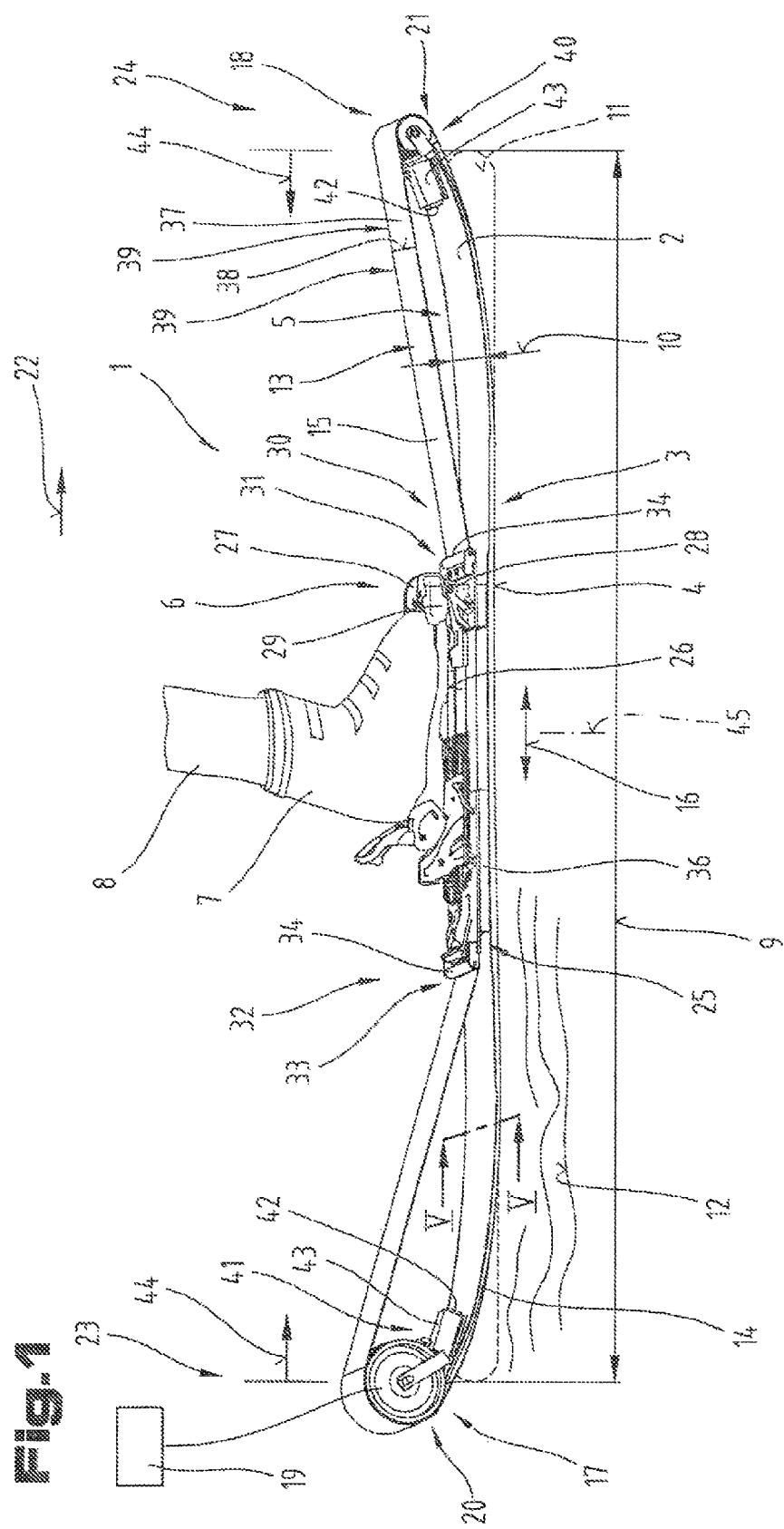

surrounded by the circulating, intrinsically closed belt (13). By means of this design, a user can be supported with regard to his advancing movement, in particular the overcoming of ascents and mountain routes can thereby be made easier, such that the body force or performance capacity to be applied by the user can be lower.

27 Claims, 12 Drawing Sheets

(51) Int. Cl.
    *B62D 51/00*     (2006.01)
    *B62D 55/06*     (2006.01)
    *B62D 55/14*     (2006.01)
    *B62D 55/12*     (2006.01)
    *B62D 55/075*     (2006.01)
    *B62D 55/24*     (2006.01)

(52) U.S. Cl.
    CPC ........... *B62D 55/075* (2013.01); *B62D 55/12* (2013.01); *B62D 55/14* (2013.01); *B62D 55/24* (2013.01); *A63C 2203/10* (2013.01); *A63C 2203/12* (2013.01)

(56) References Cited

U.S. PATENT DOCUMENTS

| | | |
|---|---|---|
| 3,853,192 A | 12/1974 | Husted |
| 3,964,560 A | 6/1976 | Husted |
| RE29,657 E | 6/1978 | Husted |
| 4,322,090 A * | 3/1982 | Loughney ............ A63C 9/0807 |
| | | 280/614 |
| 6,435,290 B1 * | 8/2002 | Justus ...................... A63C 5/08 |
| | | 180/181 |
| 2002/0074176 A1 | 6/2002 | Justus et al. |

FOREIGN PATENT DOCUMENTS

| | | |
|---|---|---|
| DE | 20 2012 101 242 U1 | 4/2012 |
| FR | 530 131 A | 12/1921 |
| FR | 2 392 688 A1 | 12/1978 |

\* cited by examiner

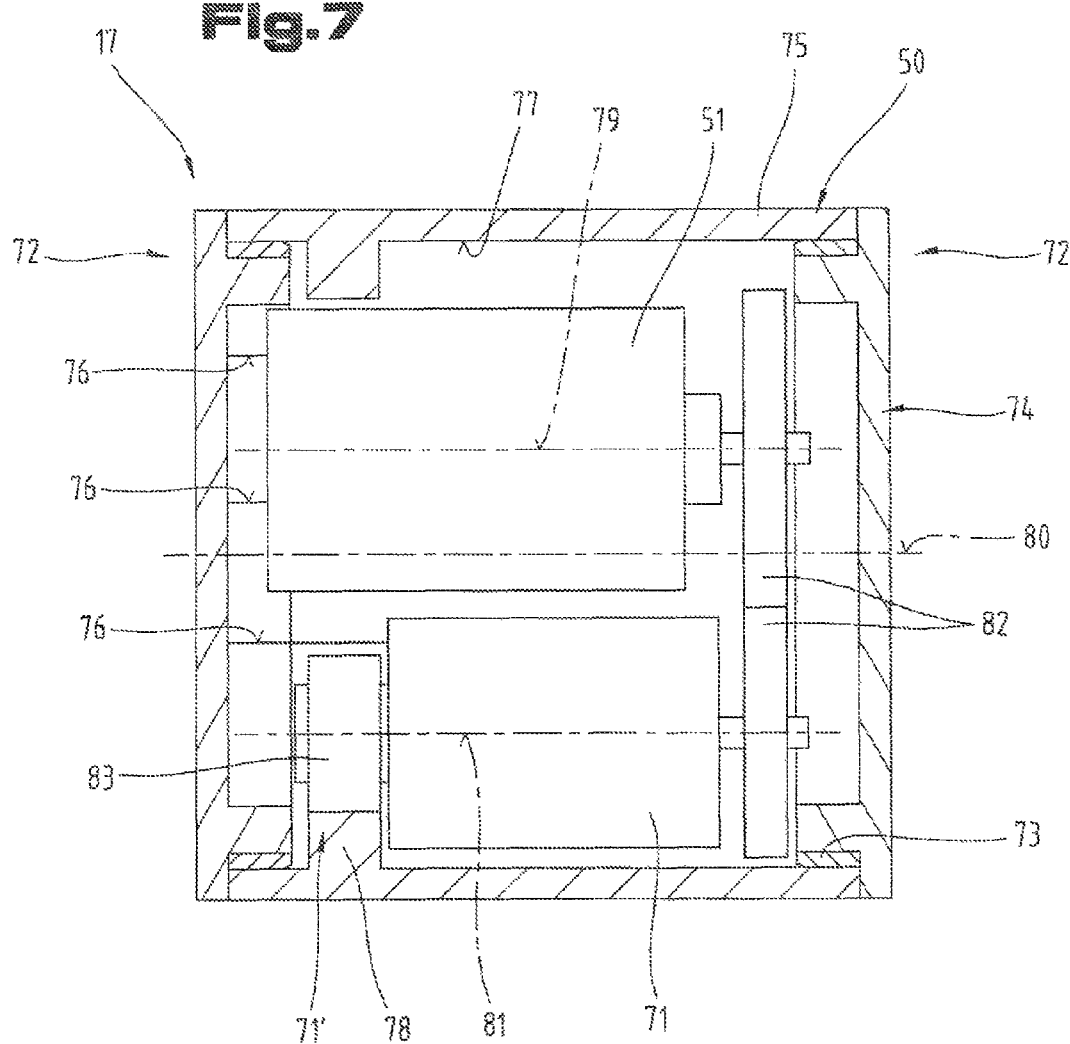
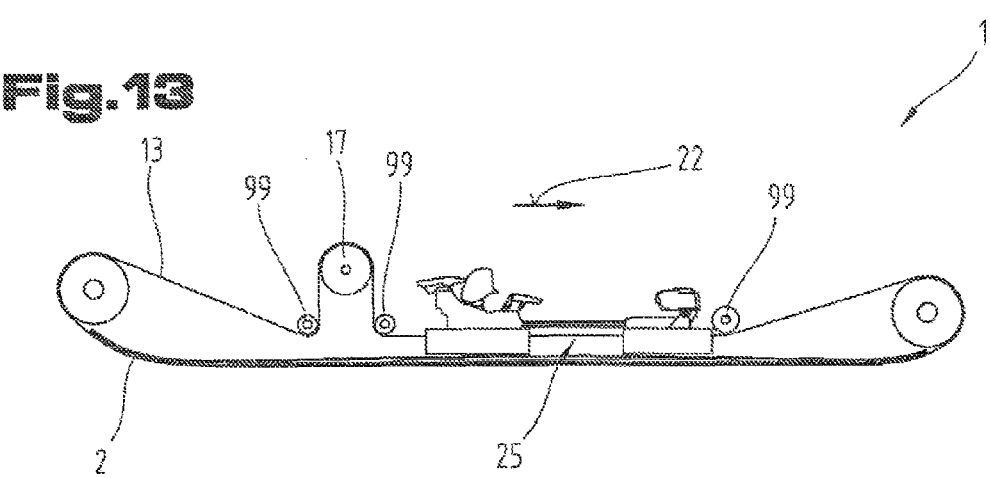

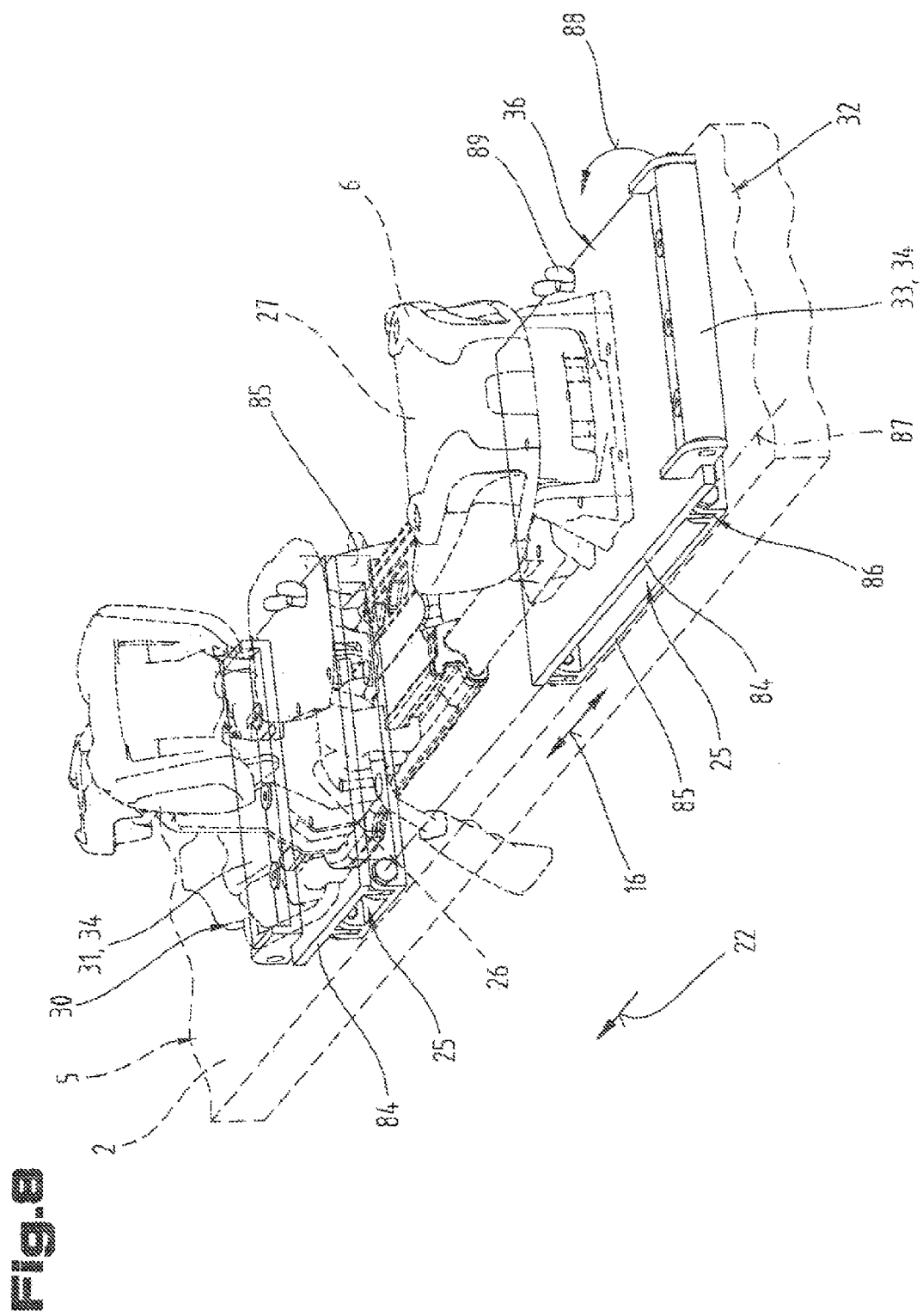

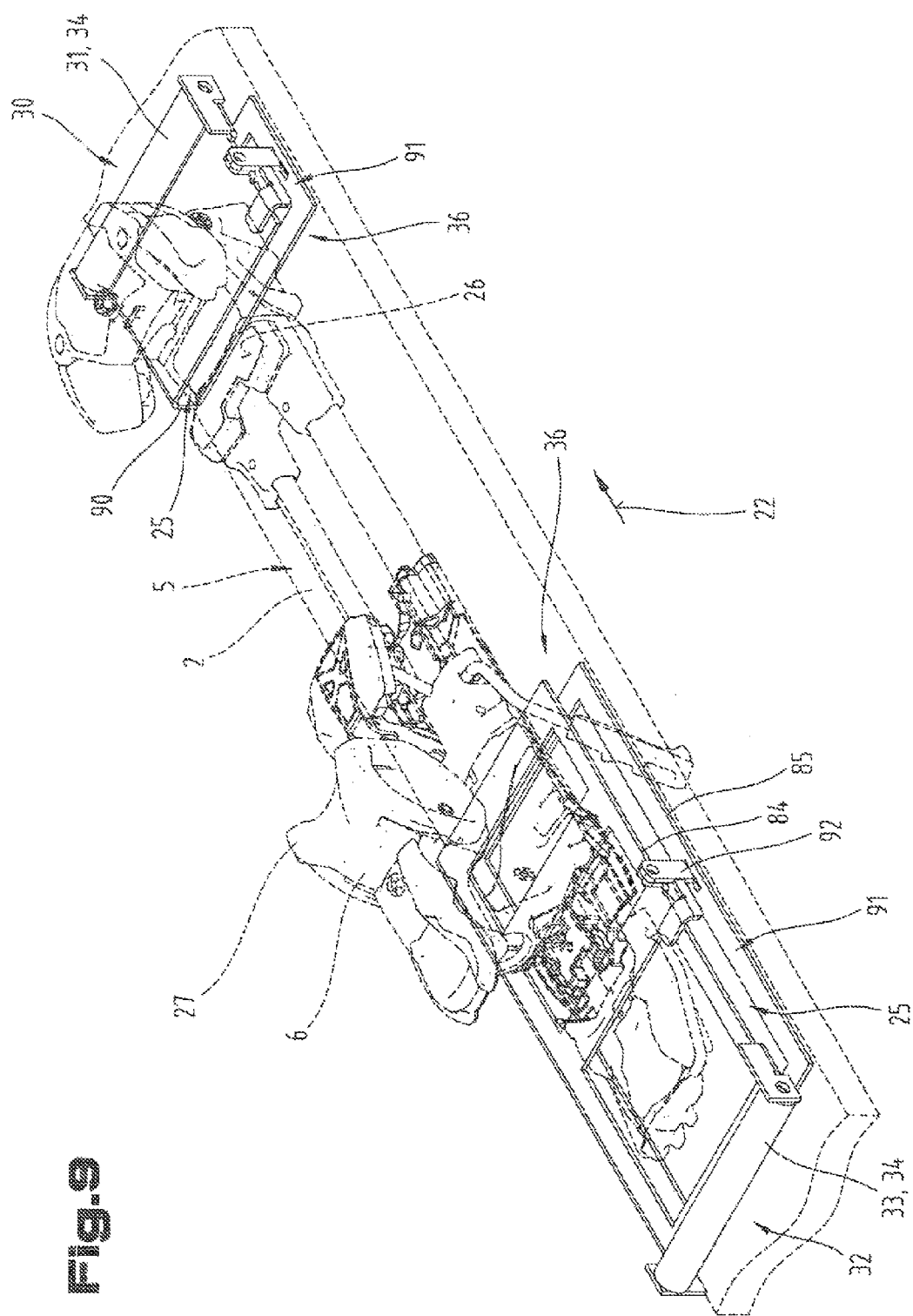

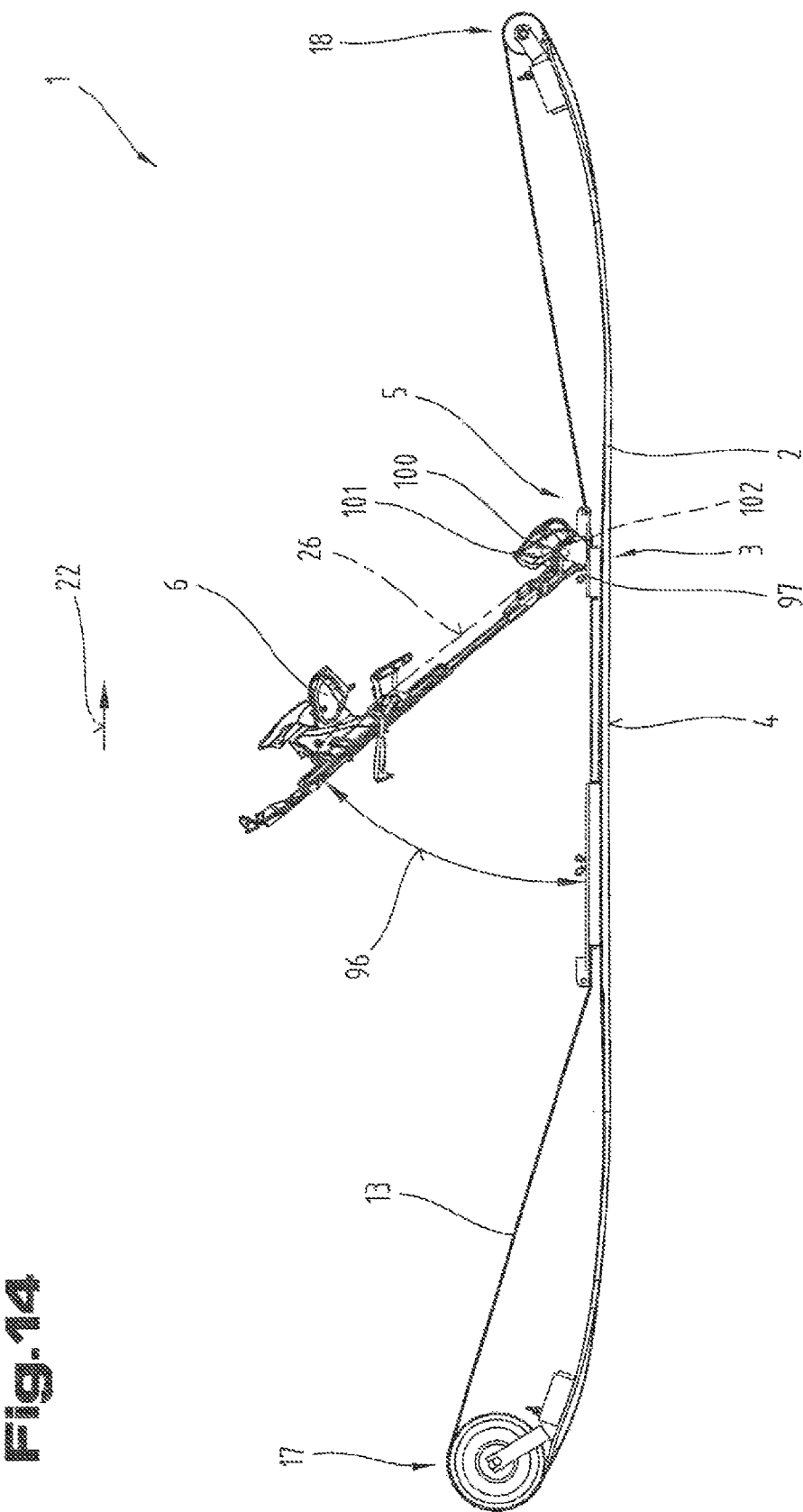

SPORTING DEVICE HAVING A SLIDING BODY AND A DRIVE FOR A CIRCULATING BELT

CROSS REFERENCE TO RELATED APPLICATIONS

This application is the National Stage of PCT/AT2015/050097 filed on Apr. 22, 2015, which claims priority under 35 U.S.C. §119 of Austrian Application No. A 50297/2014 filed on Apr. 23, 2014, the disclosures of which are incorporated by reference. The international application under PCT article 21(2) was not published in English.

The invention relates to a sporting device, as specified in claim 1.

A sporting device is known from U.S. Pat. No. 2,625,229 A, in particular an alpine ski or touring ski, having a drive in the form of a combustion motor for assisting muscular force. Accordingly, two drive belts in the form of two respectively circulating climbing skins are provided for each ski. Each of the two climbing skins is tensioned between two deflection rollers. The two drive belts together with the two deflection rollers per drive belt are all mounted on the top face of the sporting device remote from the sliding lining of the sporting device. In this respect, the two drive belts are mounted on the sporting device in such a way that one drive belt is disposed in front of the ski binding as viewed in the direction of travel and one drive belt is disposed behind the ski binding. For climbing, the sporting device is oriented so that the drive belt lies on the ground, such as snow, for example. For travelling, the sporting device is turned so that the sliding lining of the ski lies on the ground and the two drive belts are disposed on the top face. To enable a switch to be made between climbing mode and travelling mode, the middle section of the ski provided as a means of accommodating the ski binding can be turned by 180° about the ski longitudinal axis so that during use of the sporting device, the ski shoe can be coupled with the ski binding on the side of the sporting device respectively facing away from the ground. Furthermore, the ski tip can be turned by 180° so that the ski tip is always upwardly oriented and is always pointing in the direction away from the ground. The drive is provided in the form of a combustion motor which is disposed on the skier's back and supplies the requisite driving power. The driving power of the combustion motor is transmitted via flexible drive shafts to the drive belt mounted behind the ski binding. In addition, a drive shaft or a drive chain is provided between the rear and front drive belt to also enable the driving force to be transmitted from the rear drive belt to the front drive belt.

The disadvantage of the sporting device described in U.S. Pat. No. 2,625,229 A is that its construction is very heavy. Especially when travelling downwards or during downhill travel when the sliding function of the skis is used, there is a major disadvantage in that a desired positive handling of the ski cannot be achieved. Consequently, use and enjoyment of such a ski are very much impaired and the performance that can be achieved is only satisfactory under certain conditions.

Various designs of a sporting device with a drive are disclosed in FR 530 131 A. Based on a first group of embodiments illustrated in FIGS. 1, 3 and 4, a ski is provided which has a screw, the purpose of which is to transmit the requisite driving force. Based on another embodiment illustrated in FIG. 2, a base construction is provided, on which a drive roller and a plurality of deflection and/or guide rollers are mounted. A binding apparatus is mounted on the base construction by means of which a sportsman is connected to the sporting device. A drive belt is tensioned around the different rollers, the purpose of which is to drive the base construction and hence drive the sportsman.

U.S. Pat. No. 3,964,560 A discloses a sporting device comprising a sliding body, on which a bottom side is designed as a sliding surface, and a binding apparatus is disposed on the top face of the sliding body. A drive belt is also provided, which is disposed behind the sliding body and connected to the sliding body by fixing means. The drive belt is used to drive the sporting device.

US 2002/0074176 A1 discloses a sporting device having a base construction on which a drive roller and a plurality of deflection and/or guide rollers are mounted. A binding apparatus is mounted on the base construction by means of which a sportsman is connected to the sporting device. A drive belt is tensioned around the different rollers, the purpose of which is to drive the base construction and hence drive the sportsman.

The objective of this invention is to propose an improved sporting device which is as lightweight as possible and offers improved handling properties, especially in travelling mode.

This objective is achieved by the invention on the basis of the features specified in claim 1.

The invention proposes a sporting device, in particular a touring ski assembly, which is used in pairs, a sporting device and a touring ski assembly being provided for each foot of the user. The sporting device comprises a sliding body on which a bottom side is designed as a sliding surface, a binding apparatus, in particular a touring binding, for fastening to a sporting shoe of a user in such a way that it can be released as and when necessary, disposed on the top face of the sliding body, as well as a drive apparatus and at least a first deflecting apparatus for the belt. In a first segment, the belt is disposed next to the bottom side of the sliding body and in a second segment it is disposed next to the top face of the sliding body. Furthermore, at least the majority of the length of the sliding body is surrounded by the circulating, intrinsically closed, belt. The belt can be moved by the drive apparatus at least in a longitudinal direction relative to the sliding body.

One advantage of the design proposed by the invention is that the structure of the sporting device is kept as simple as possible. Accordingly, the sporting device has as low a weight as possible, thereby making it easier to carry the sporting device on the one hand and also improving the handling properties of the sliding body in travel mode of the sliding body on the other hand. Due to the specified structure of the sporting device, the belt can be removed relatively easily from the sporting device so that the sporting device can be rapidly switched from climbing mode to travel mode—and vice versa. Furthermore, due to the simple structure of the sporting device, as small a number of moving parts as possible is achieved, thereby reducing susceptibility to faults and/or the likelihood of functional impairment of the sporting device. Another advantage of the design proposed by the invention is that a good transmission of the driving force applied by the drive apparatus to the ground can be achieved, such as snow or ice. Another advantage resides in the fact that almost all conventional sliding support constructions or skis which have already proven themselves in practice can be used. In particular, no structurally complex special constructions are needed for the sliding device, which means that the cost of procuring the sporting device can be kept as low as possible. In addition, due to the specified features, the standing height of the user relative to the ground can be kept relatively low.

It may also be of practical advantage if the drive apparatus is disposed at a first longitudinal end of the sliding body and the deflecting apparatus is disposed at the opposite, second longitudinal end of the sliding body so that the sliding body is completely surrounded by the circulating belt in terms of its length. The advantage of this is that the sporting device can be switched particularly quickly and easily from climbing mode to travel mode—and vice versa. Another advantage of these features is that a standard or more or less standard touring ski with a sliding body that can be produced in relatively large numbers may be used to implement the sporting device without having to undertake complex modifications on the sliding body. Due to the preferred approach in which the belt circulates around the entire length of the sliding body, a particularly effective and stable grip of the belt on the ground can be achieved. Based on one practical embodiment, the belt extends out around the front and rear ski ends, in particular around the front and rear upwardly curved ski shovel of the ski.

Furthermore, the second segment is inserted through a gap underneath a shoe support plane of the binding apparatus. The advantage of this is that the belt can be run in a circulating or annular closed shape and can then be easily returned. This also avoids having to turn the belt at an angle or deflect it sideways as viewed in the belt longitudinal direction.

Furthermore, the gap may be disposed between a connecting device for establishing an articulated connection of the binding apparatus to the sliding body and top face of the sliding body or between connecting elements for establishing an articulated connection of the sporting shoe to the binding apparatus and sliding body. Disposing the gap in this region is of particular advantage because the gap can be easily integrated in the binding apparatus or in a supporting plate underneath the binding apparatus or can be easily and securely provided using a pedestal-type retaining construction for the binding.

Also of advantage is a feature whereby the belt can be provided as an endless climbing aid which prevents backsliding, in particular a climbing skin. Such a belt is particularly effective for preventing backsliding on smooth or slippery ground, such as snow or ice, when making stepping movements and driving movements, to ensure reliable forward movement and/or a relatively efficient and effortless climbing movement. Furthermore, this enables a relatively lightweight construction to be obtained. In addition, in the event of any gradually occurring wear or the occurrence of fatigue, the belt can be easily and inexpensively replaced.

Based on another embodiment, the belt can be closed in an annular shape and opened as and when necessary by means of an activatable and deactivatable coupling device. The advantage of this is that the annular closed belt can be easily threaded onto and mounted on the sporting device due to the ability to open it and there is therefore no need for any feature or means to enable the belt to be threaded through the gap underneath the shoe support plane in order to fit the intrinsically closed endless belt. Furthermore, such a belt that can be removed from the sporting device can be easily rolled up in the open state and thus easily stowed in a rucksack and compactly transported.

Alternatively, the annular belt may be inseparably joined, in particular by belt ends that are welded to one another. The advantage of this embodiment is that a high stability and tensile strength can be imparted to such a belt. Furthermore, such a belt can be efficiently run around a drive roller or deflection roller without resistance, in particular relatively uniformly and harmoniously. The robustness and assembly costs can be optimized as a result of this technical feature.

It may also be of practical advantage if the drive apparatus is disposed on a rear end section of the sliding body as viewed in the direction of forward movement and the first deflecting apparatus is disposed on the front end section of the sliding body. The advantage of this is that the force transmitted from the drive apparatus to the belt can be directed as directly as possible or via the shortest route to the ground and thus converted into a forward movement. As a result, the second, returning segment is subjected to as little tensile force as possible, namely the pre-tensioning force. Furthermore, this means that the relatively heavier drive apparatus is mounted on the rear end of the sliding body, which is conducive to the handling properties of the sporting device in climbing mode and when making stepping movements during climbing.

Furthermore, the drive apparatus and/or the first deflecting apparatus are retained in such a way that they can be mounted on and removed from the sliding body as and when necessary by means of at least one coupling device. The advantage of this is that the handling properties of the sliding body can be improved, especially in travel mode, because the additional weight of the drive apparatus and/or the first deflecting apparatus no longer acts on the sliding body and/or is no longer coupled with the sliding body.

Based on another embodiment, the at least one coupling device comprises a first coupling element and a second coupling element co-operating therewith and a coupling movement between the first and second coupling element extends substantially in the longitudinal direction of the sliding body and is oriented in the direction towards the longitudinal center of the sliding body. The advantage of this is that due to such a coupling element, the drive apparatus and/or the deflecting apparatus can be push-fitted on the sliding body and held in position due to the pre-tensioning of the belt. Consequently, no separate tool is needed in order to secure the drive apparatus and/or deflecting apparatus. Accordingly, a switch from climbing mode to travel mode and vice versa can be made as quickly and easily as possible without an additional tool.

Alternatively, the drive apparatus and/or the deflecting apparatus can be moved, in particular pivoted, between an operating position tensioning the belt when the sporting device is in climbing mode and a non-operating position releasing the belt when the sliding body is in travel mode. The advantage of this is that the drive apparatus and/or the deflecting apparatus do not have to be stowed in a rucksack when the sliding body is in travel mode and instead can remain on the sliding body and can be positioned so that they cause as little disruption as possible during travel.

Furthermore, by reference to the longitudinal extension of the sliding body, at least a third and a fourth deflecting apparatus, in particular at least one slide guide or deflection roller, may be provided in front of and behind the binding apparatus, by means of which the second segment of the belt is guided and/or deflected. The advantage of this is that the belt, in particular the second segment, can be efficiently run underneath the binding apparatus without it being in contact with parts of the binding apparatus itself. This prevents the belt being damaged by the binding apparatus. In addition, any friction losses which might occur can be kept as low as possible, which is conducive to the maximum service life of the belt and the length of time for which the power supply source can be used.

Based on one particular feature, the belt may be provided with transverse webs at least in certain regions of its internal face or orifices extending between its internal and external face to form toothing, which toothing meshes with co-operating toothing of a drive roller of the drive apparatus. The advantage of this is that the work applied or torque supplied by the drive apparatus can be efficiently transmitted to the belt and hence to the ground without the drive apparatus slipping relative to the belt. Also of particular advantage as a result of this feature is the fact that the pre-tensioning of the belt can be kept relatively low so that the sporting device can be switched from travel mode to climbing mode and vice versa rapidly and easily or effortlessly because no particularly strong forces have to be applied by the user, e.g. clamping forces.

Based on another advantageous embodiment, the belt may have at least one web in at least a certain region of its internal face extending in the belt longitudinal direction, which runs in a co-operating recess in the sliding surface of the sliding body. The advantage of this is that such a web can serve as a lateral guide. As a result, even if a force is transmitted from the ground to the belt transversely to the longitudinal direction, the belt will not slip sideways off the sliding body. Furthermore, this also imparts a high tensile strength to the belt for a relatively small height or thickness so that the standing height of the user from the ground remains as low as possible.

It may also be of advantage if the at least one longitudinally extending web on the internal face of the belt comprises a plurality of mutually spaced transverse ribs which form toothing to establish a meshing connection with a drive roller of the drive apparatus. The advantage of this is that the toothing can simultaneously be provided as a web. This reduces the complexity involved in manufacturing the belt and it can be assembled as easily and simply as possible. In addition, this also enables a relatively small deflection radius for the belt to be achieved without increased resistance and/or inherent frictional forces occurring, which has a positive effect on service life and does not have a negative effect on the amount of energy which needs to be applied.

It may also be of practical advantage if a width of the web extends across only a part-section of the width of the belt and, by reference to the cross-section of the belt, at least the outer segments are provided with sliding surfaces on the internal face of the belt which reduce friction with the sliding surface of the sliding body. The advantage of this is that in addition to guiding the belt due to the at least one web, preferably disposed at the longitudinal center, ease of movement of the belt relative to the sliding surface of the sliding body can also be improved because friction losses can be kept as low as possible. In addition, this also prevents excessive wear of the belt and/or sliding surface as well as lengthening the life of the rechargeable battery pack and increasing energy efficiency.

Furthermore, the drive apparatus may comprise an electric motor and optionally a reducing gear. The advantage of this is that an electric motor makes very little noise compared with a combustion motor. Furthermore, an electric motor can be made to as small and lightweight a design as possible. In addition, an electric motor is particularly low in maintenance and/or maintenance-free in terms of its drive behavior and/or can be efficiently controlled and/or regulated in terms of its driving power. Another major advantage of an electric motor resides in the fact that it can be operated without impacting the environment and no combustible fluids or other hazardous fuels have to be carried.

Furthermore, the drive apparatus may be based on a design without a shaft because a drive roller of the drive apparatus has a rotary bearing on at least one axial end face by means of which the drive roller can be rotatably connected to a bearing block secured to the sliding body. The advantage of this is that the drive apparatus can be built to as simple and lightweight a design as possible. In addition, such a design is particularly robust and capable of withstanding load and will remain wear-free for a long time.

Also of advantage is a feature whereby the drive roller may be provided in the form of a thin-walled hollow cylinder and an electric motor and an optionally provided reducing gear can be disposed inside the hollow cylindrical drive roller. The advantage of this is that with such a design, a further saving on weight can be made. Furthermore, the electric motor and the gear can be accommodated in a space-saving arrangement so that they are protected from environmental influences. Furthermore, this also results in a high degree of robustness and lack of susceptibility to problems because the electric motor and the optionally provided gear can be placed inside the hollow cylindrical drive roller and are thus well protected from environmental influences such as impacts knocks, dust, moisture or other effects of the weather, for example. In addition, this enables a particularly compact design to be achieved.

Based on another embodiment, the drive roller may have a toothed rim on its hollow cylindrical internal wall by means of which the drive roller can be driven by means of the electric motor or the interconnected reducing gear. The advantage of this is that due to these features, a certain speed reduction is achieved. Consequently, if a reducing gear is needed, it is possible to manage with one of a smaller design or it can be dispensed with altogether. The compactness and functional reliability as well as the technical robustness can also be improved as a result.

It may also be of practical advantage if the drive apparatus comprises a wheel hub motor, the rotor of which defines or accommodates the drive roller. The advantage of this is that such a wheel hub motor is a tried and tested as well as optimized mass produced product, which can be produced and supplied particularly cost-effectively and which can also be easily integrated in the drive roller.

Furthermore, a power supply source may be provided in the form of an electrochemical rechargeable battery, in particular a lead gel, nickel-cadmium (NiCd), nickel-metal hydride (NiMH) or lithium ion (Li-Ion) rechargeable battery, by means of which the drive apparatus can be supplied with electrical energy. Such rechargeable batteries are used with electric bicycles, for example, and may be the optimum choice for use with the sporting device proposed by the invention. In particular, such power supply sources offer an optimized weight-power ratio, are readily available and inexpensive as well as guaranteeing uncritical and simple handling.

Furthermore, an electrical control unit may be connected to the drive apparatus and configured to control the drive apparatus, which control unit comprises a digital input device or a potentiometer, by means of which a rotation speed and hence associated speed of movement and/or a cycle time and/or switching times of the drive apparatus can be predefined or are variably adjustable. The advantage of this that such an electrical control unit is capable of handling sequential activation of the electric motor in a particularly versatile and reliable manner. It is also of advantage if the rotation speed of the electric motor and the cycle time and/or switching times can be variably set. As a result, the speed of a travelling or forward movement, a step frequency, or a motor-assisted power can be adapted and set to suit the requirements of the respective user. One advantage of being able to set the cycle time is that the travel distance of the sporting device can be adapted to the step length of the user. The sporting device can therefore be used by different users.

Based on one particular feature, the control unit may be connected to at least one detection means, for example a switch contact or an electrical sensor, in order to detect an activation command for the drive apparatus. The advantage of this is that the activation command for the drive apparatus can be predefined on the part of the user or at least influenced or partly defined. In particular, this means that a user can consciously activate and/or deactivate and/or influence the power assistance provided by the drive apparatus. The behavior of the sporting device can therefore be spontaneously and efficiently adapted to the individual requirements of the user and/or to changing circumstances and environmental conditions.

Furthermore, the at least one detection means is configured to detect a control command actively or consciously initiated by a user and/or to detect a state of motion induced by the physiological motion sequence, for example a predefined position of angular rotation or pressure load, and the drive apparatus is activated as a function of the states detected by the at least one detection means. The advantage of this is that the controller reacts to consciously and/or manually set commands and/or to commands of the user set unconsciously and/or on an automated basis, in particular coupled with the physiological walking and/or motion sequence, and the sporting device can therefore be optimally operated and/or used on an optimized basis.

It may also be of practical advantage if the detection means is provided in the form of an acceleration sensor, in which case a movement of the user is detected by the acceleration sensor and the drive apparatus is activated on the basis of the detected states. The advantage of this is that an acceleration sensor can be built to a small design. Furthermore, an acceleration sensor efficiently detects the current state of motion of the user in order to generate therefrom a control command for activating the drive apparatus.

Finally, the binding apparatus may comprise a binding drive, by means of which the binding apparatus can be actively turned or pivoted into a position of angular rotation. The advantage of this is that the user can be additionally assisted in his/her walking movement, and the user and/or at least his/her heel can be actively lifted from the sporting device by means of the binding drive, thereby increasing the potential energy of the user. In this respect, it is of advantage if this binding drive comprises a pivot drive for the binding apparatus and/or for the toe-end shoe retaining unit, in particular for the front retaining body of the sporting shoe.

The step length is the degree by which the user pushes one foot in front of the other during normal walking movement. The step length is very much dependent on the leg length of the user. Furthermore, the step length of a user may also vary, for example depending on the condition of the ground, the current body stance of the user, etc.

To provide a clearer understanding, the invention will be described in more detail below with reference to examples of embodiments illustrated in the appended drawings.

Figure 2:
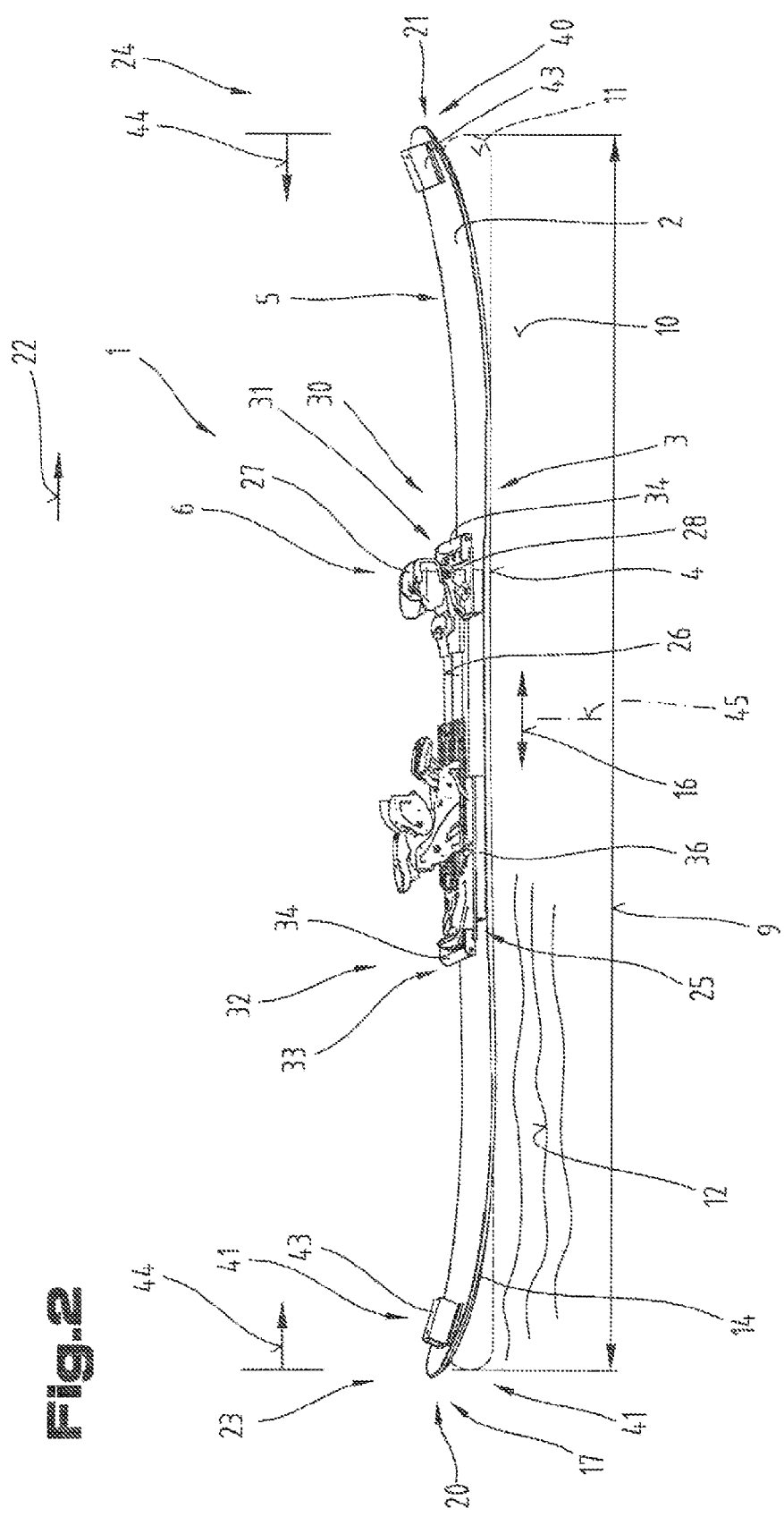
Figure 3:
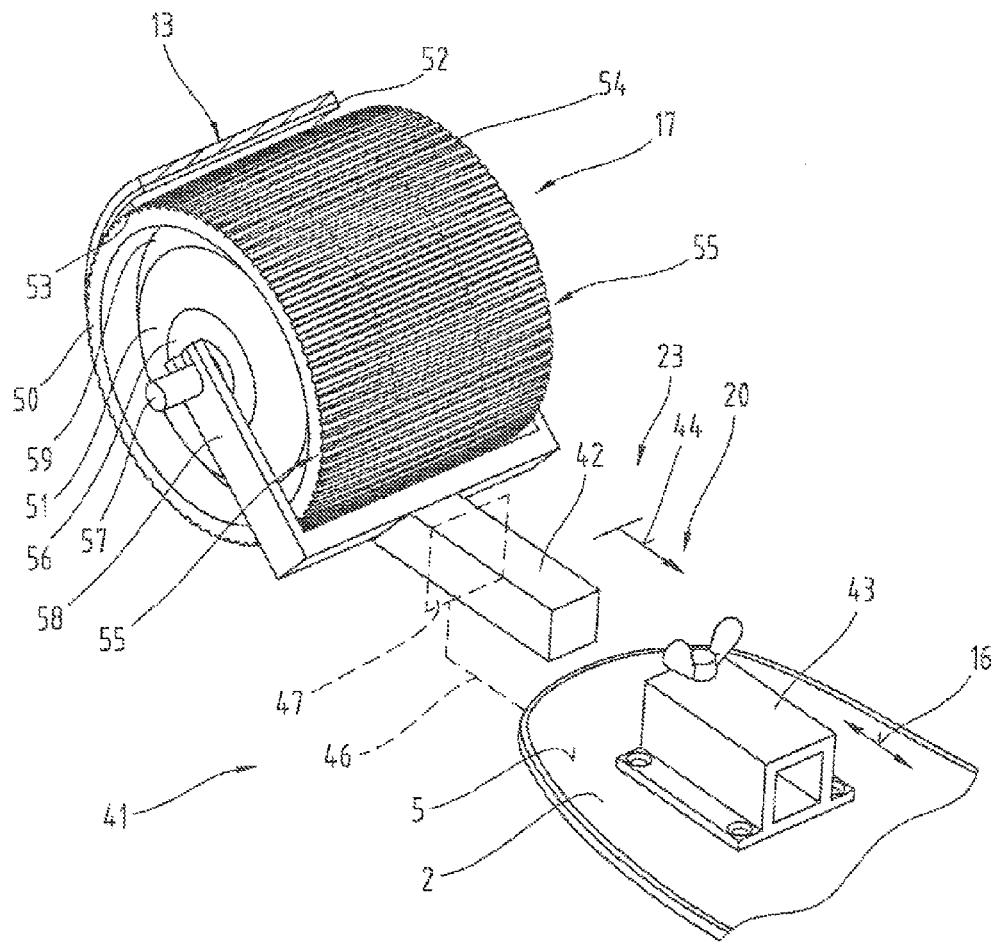
Figure 4:
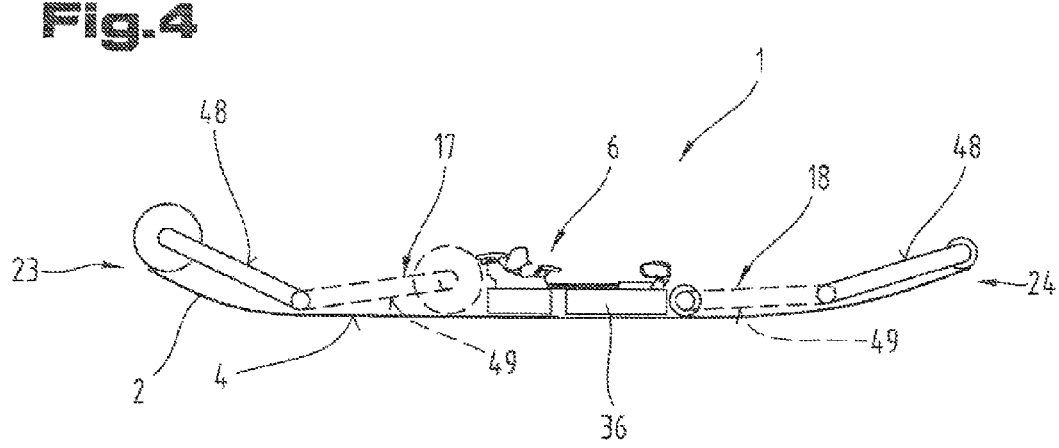
Figure 5:
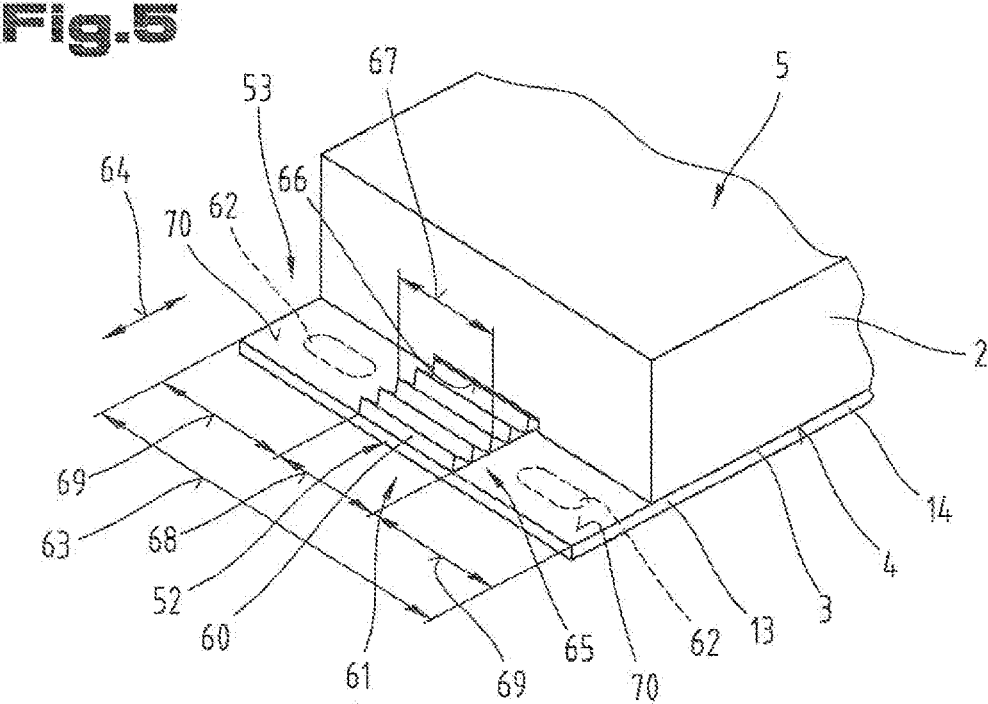
Figure 6:
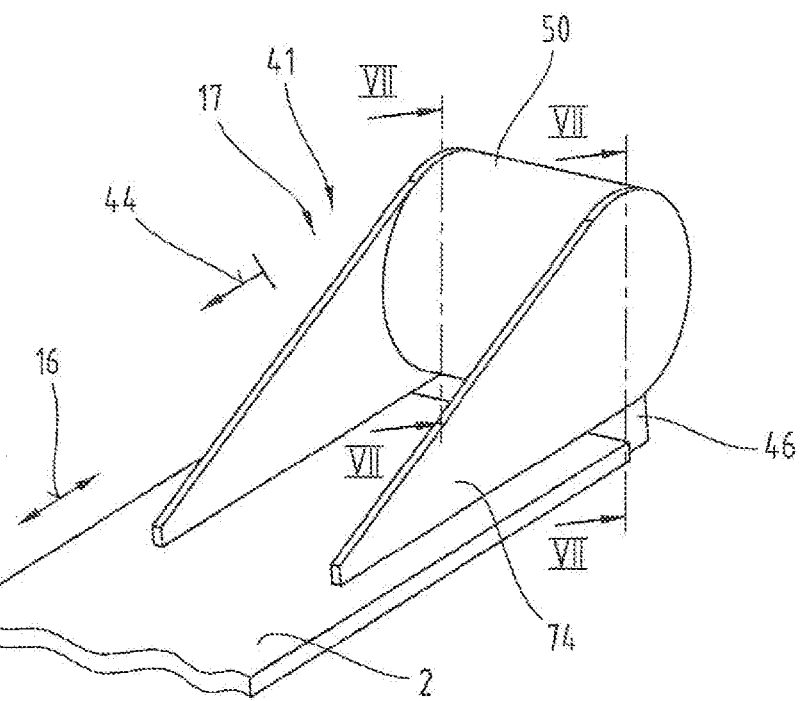
Figure 10:
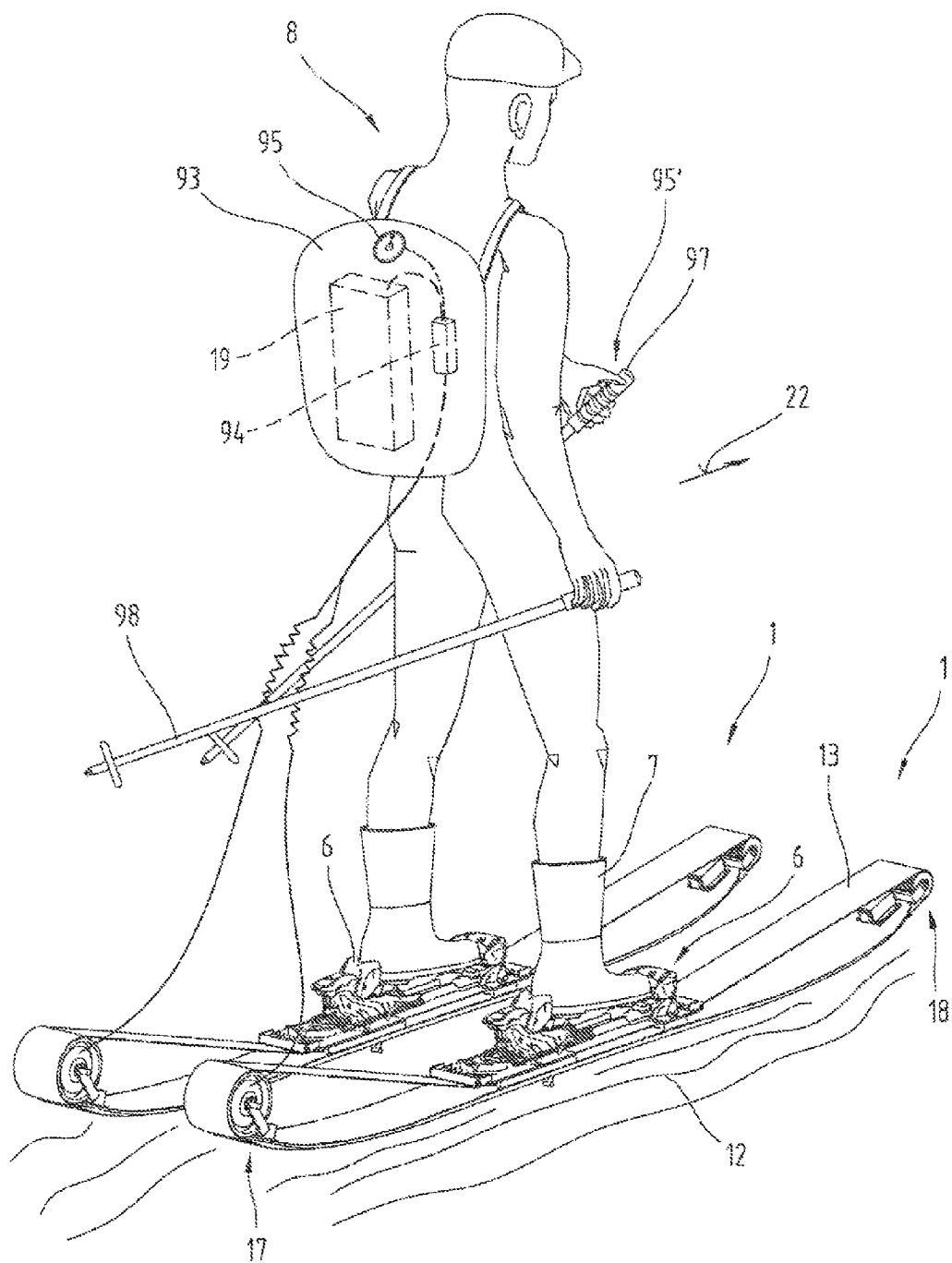
Figure 11:
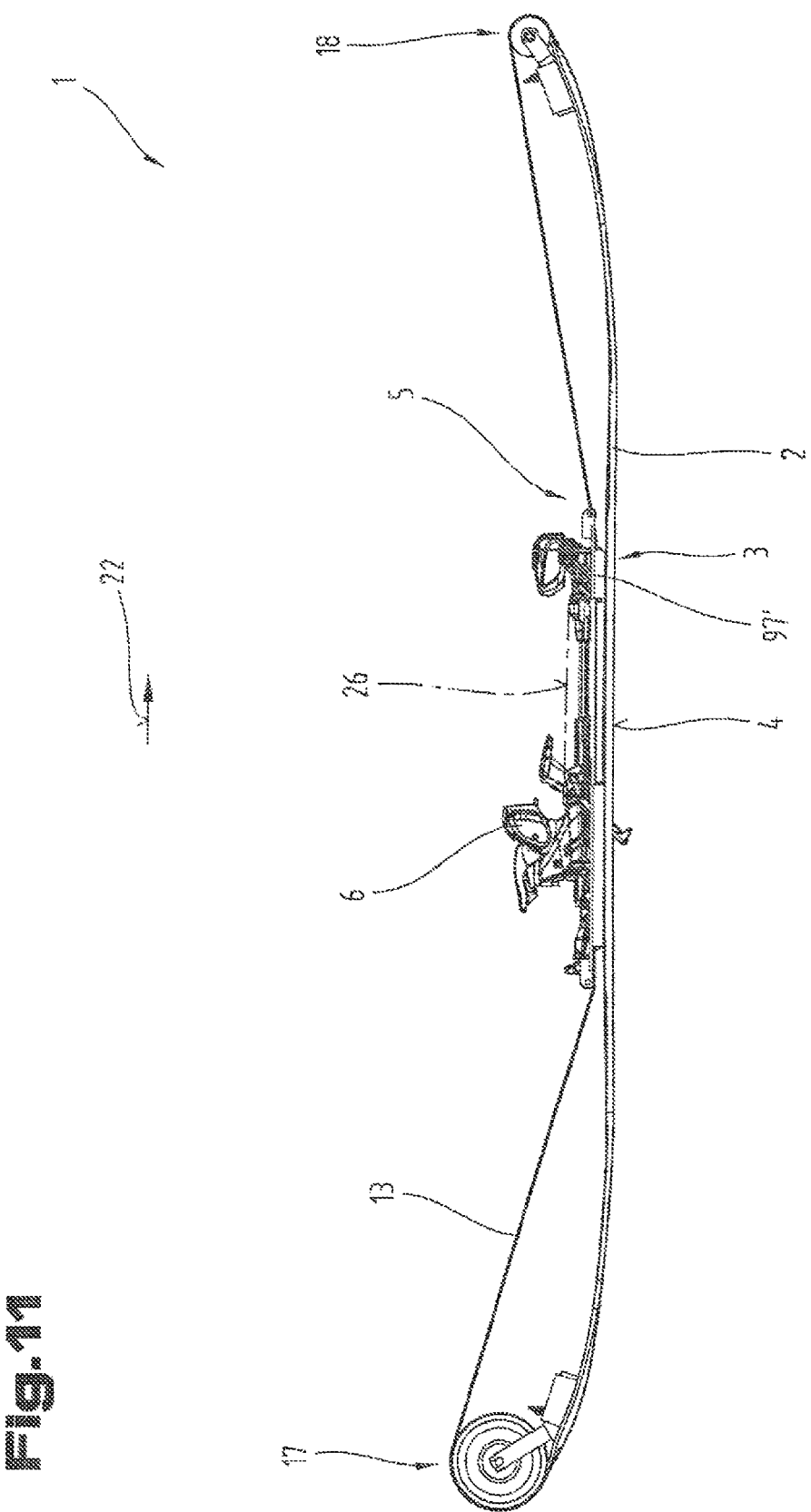
Figure 12:
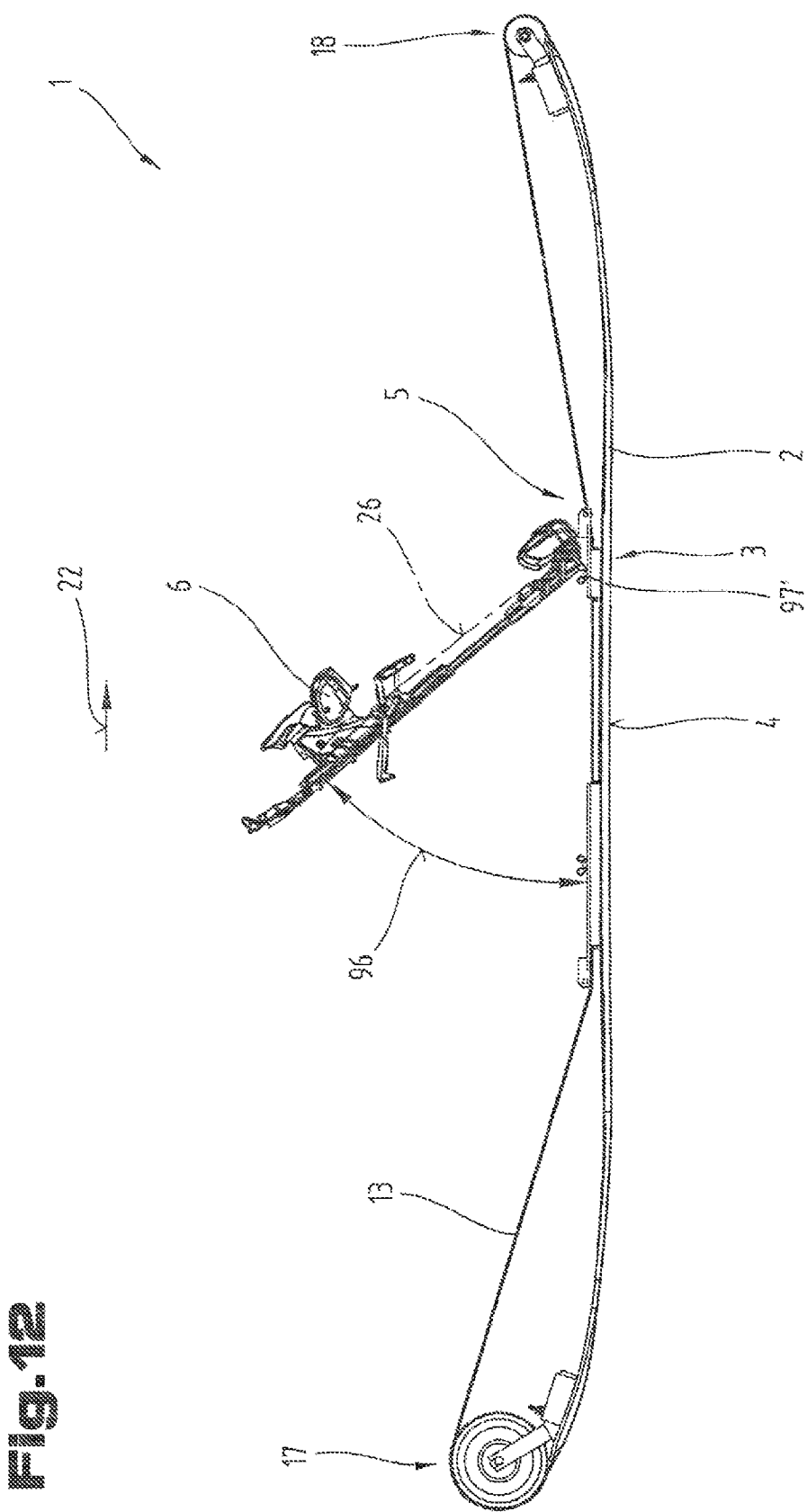
Figure 15:
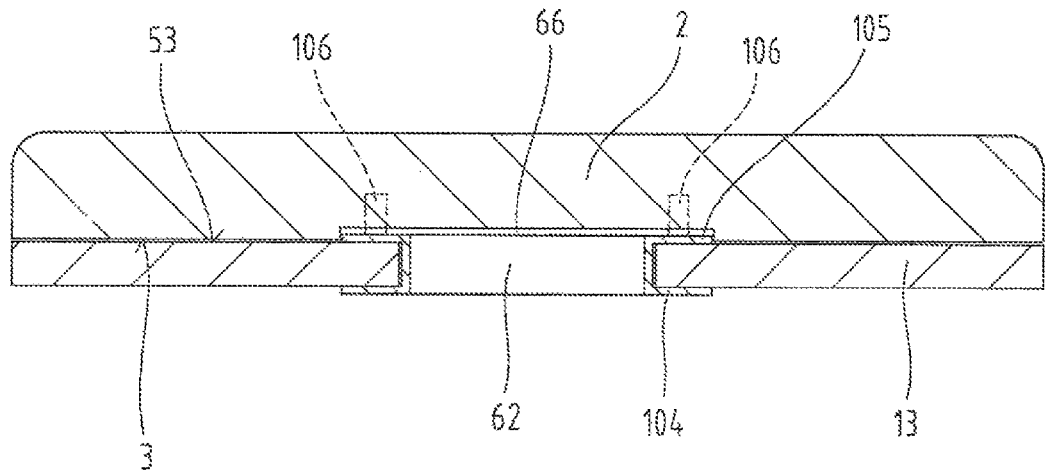
Figure 16:
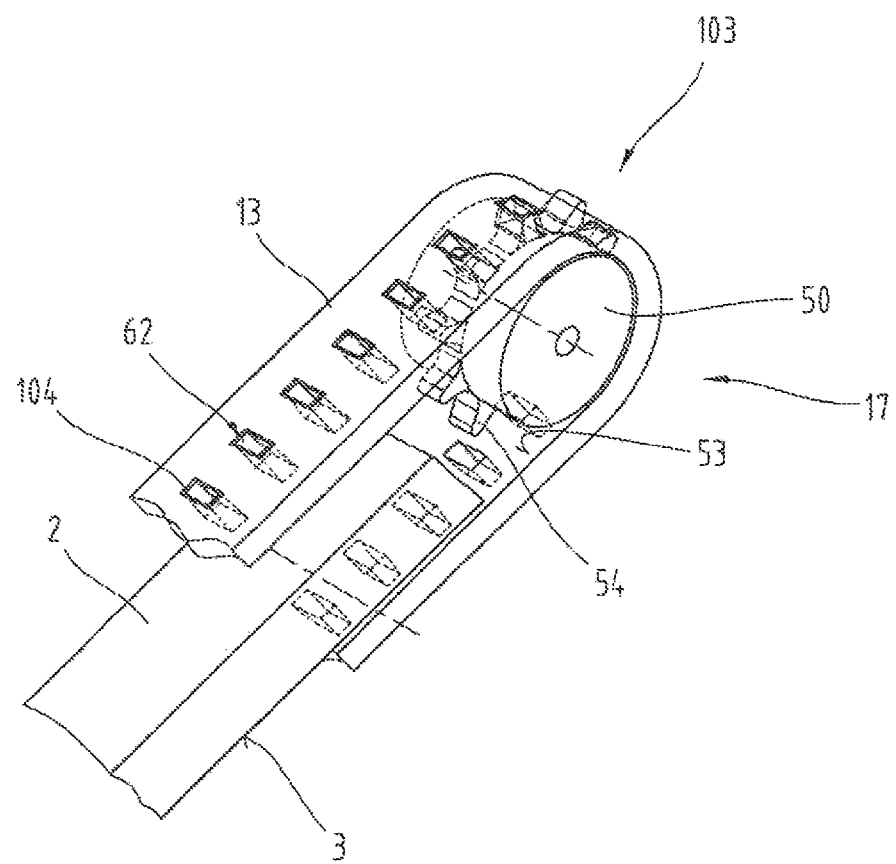

These are highly simplified, schematic diagrams illustrating the following:

FIG. 1 a perspective view of a sporting device with a circulating belt in climbing mode, in the non-pivoted non-operating position of the sporting shoe;

FIG. 2 a perspective view of the sporting device in travel mode without the circulating belt, in the state in which a sporting shoe is not coupled with it;

FIG. 3 a perspective view of one embodiment of a drive apparatus of the sporting device;

FIG. 4 a side view of a sporting device with a drive apparatus and deflecting apparatus that can be pivoted in and out in travel mode but without the belt element for assisting out the transmission of force during an ascent and/or forward movement;

FIG. 5 a perspective view of a section along section line V-V indicated in FIG. 1;

FIG. 6 a perspective view of another embodiment of a drive apparatus for the sporting device;

FIG. 7 a diagram in section through the drive apparatus illustrated in FIG. 6, in particular along section line VII-VII indicated in FIG. 6;

FIG. 8 a perspective view of an embodiment of the sporting device with a support construction for the binding apparatus;

FIG. 9 a perspective view of another embodiment of a support construction together with binding apparatus;

FIG. 10 a perspective view of a user with sporting devices strapped to his feet or sporting shoes, in climbing mode;

FIG. 11 a side view of the sporting device in climbing mode or uphill mode with the binding apparatus pivoted into a position parallel with the skis;

FIG. 12 a side view of the sporting device in climbing mode or uphill mode with the binding apparatus in an upwardly pivoted position;

FIG. 13 a side view of another embodiment of a sporting device in climbing mode with an inactive binding apparatus for a sporting shoe oriented parallel with a ski;

FIG. 14 a side view of the sporting device in climbing mode or uphill mode with the binding apparatus in an upwardly pivoted position and having the pivot drive for the binding apparatus;

FIG. 15 a perspective view of the drive apparatus with an actively drivable belt having orifices in which toothing of the drive apparatus engages;

FIG. 16 a diagram in section of the belt with orifices along section line XV-XV indicated in FIG. 15.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 illustrates a perspective view of a sporting device 1, in particular a touring ski assembly, in climbing mode or forward movement mode for travelling long distances or ascending terrain or mountain runs. FIG. 2 illustrates the sporting device 1 in travel mode or travelling mode in which its sliding function is used.

The sporting device 1 comprises a sliding body 2 on which a bottom side 3 is designed as a sliding surface 4. In particular, the bottom side 3 of the sliding body 2 may comprise or be formed by a wear-resistant running surface facing which generates as little friction as possible on snow or ice, for example made from polyethylene. Disposed on a top face 5 of the sliding body 2 is a binding apparatus 6, which is used to receive a sporting shoe 7 of a user 8. The binding apparatus 6 should be construed as being a coupling device which enables at least one connection to be established between a sporting shoe and the sporting device 1 that can be activated and deactivated as and when necessary.

The sliding surface 4 preferably extends across the entire length 9 of the sliding body 2 and across the entire width 10 of the sliding body 2 and thus more or less corresponds to the external contour of the sliding body 2 in terms of its dimensions. In particular, the major part or predominant surface portion of the bottom side 3 of the sliding body 2 is therefore formed or covered by the sliding surface 4. An exception to this above all might be the so-called steel or control edges which can be fitted on the two lengthways edges on the bottom side 3 of the sliding body 2. In other words, the sliding surface 4 substantially corresponds to the projected surface 11 in the direction towards a top face 5 of the sliding body 2.

The sliding surface 4 is the surface which, in the travel mode of the sliding body 2 illustrated in FIG. 2, lies on the ground 12, such as snow or ice. A front shovel section and if necessary a rear shovel section of the sliding body 2 on the bottom side facing the ground preferably also form part of the friction-reducing sliding surface 4.

Furthermore, the sporting device 1 illustrated in FIG. 1 comprises a circulating belt 13. The circulating, intrinsically closed belt 13 is used to enable a relative sliding movement of the sporting device 1, in particular the sliding body 2, relative to the ground 12 when the sporting device 1 is in the climbing mode illustrated in FIG. 1 and thus assist the user 8 with his/her walking movement or forward movement.

The circulating, annular closed belt 13 comprises a first segment 14 or bottom belt strand disposed next to the bottom side 3 of the sliding body 2, in particular directly on or against the bottom side 3 or sliding surface 4 of the sliding body 2. In order to define an endless belt, the belt 13 also has a second, returning segment 15 or top belt strand disposed next to the top face 5 of the sliding body 2. In particular, this enables a continuous circulation of the belt 13. Due to this design, the belt 13 circulates and is run in an annulus around the sliding body 2 and around its longitudinal ends.

In other words, it is of advantage if—by reference to the longitudinal direction 16 of the sliding body 2—the sliding body 2 is surrounded or enclosed at least more or less along its length 9 or along its entire length 9 by the circulating, annular closed belt 13.

To enable the circulating belt 13 to be guided and retained on the sliding body 2, at least one drive apparatus 17 and at least a first deflecting apparatus 18 are provided, between which the belt 13 can be tensioned.

In the embodiment illustrated as an example, the first segment 14 is disposed so that it lies against or lies along the sliding surface 4 of the sliding body 2, and at least in the sliding body part-sections in front of and behind the binding apparatus 6, the belt lies directly on its bottom side 3 or on its sliding surfaces 4. The second segment 15 is disposed next to the top face 5 of the sliding body 2.

As may clearly be seen from FIG. 1, the sporting device 1 is based on a design akin to a caterpillar track in order to assist the user 8 with his/her walking movement and make it easier for him/her to climb a mountain or travel cross country in the climbing mode illustrated in FIG. 1.

To this end, the drive apparatus 17 is supplied with the requisite outside energy from an external power supply source 19 in order to set the sporting device 1 together with the user 8 standing on it in motion and/or to assist his/her physiological motion and walking sequences. The energy from the power supply source 19 is used in particular to make forward movements of the user easier, i.e. requiring less force to be expended and/or to accelerate such forward movements and/or enable them to be carried out for a longer time.

Based on a preferred embodiment, the drive apparatus 17 is disposed on a first longitudinal end 20 of the sliding body 2 where it is secured to and retained on the sliding body 2. The first deflecting apparatus 18 is disposed on a second longitudinal end 21 of the sliding body 2 opposite the first longitudinal end 20.

Based on one advantageous embodiment illustrated in FIG. 1, the first longitudinal end 20 and hence the drive apparatus 17 is disposed at a rear end section 23 of the sporting device 1 relative to the usual direction of forward movement 22 of the sporting device 1. Accordingly, the second longitudinal end 21 and hence the first deflecting apparatus 18 is disposed at a front end section 24 of the sporting device 1.

As an alternative to the embodiment just described, it is also possible for the drive apparatus 17 to be disposed on the front end section 24 of the sporting device 1 and the first deflecting apparatus 18 to be positioned in the rear end section 23 of the sporting device 1.

Based on another embodiment, it would also be conceivable for a first deflecting apparatus 18 and another deflecting apparatus to be disposed on the front end section 24 and on the rear end section 23 and for the drive apparatus 17 to be disposed at some other point of the belt 13, in particular the second segment 15. One possible example of this is illustrated in FIG. 13. In this instance, the drive apparatus 17 is positioned in a region between the rear and front longitudinal ends 20, 21 of the sliding body 2.

To enable the belt 13, in particular the top or second segment IS, to be advantageously guided on the sporting device 1, the second segment 15 may be inserted in a gap 25 below a shoe support plane 26 of the binding apparatus 6. As a result, the second segment 15 is advantageously guided on the top face of the sporting device 1 without the user 8 being restricted by the second segment 15 in his/her freedom of movement.

Based on one practical embodiment, the top or second segment may be guided at a distance above the sliding body 2. In particular, the top or second segment 15 does not contact the top face 5 of the sliding body 2 at least across the majority of its length, thereby enabling frictional forces to be minimized. Based on the illustrated embodiment, the top or second segment 15 is able to run freely in the part-sections in front of and/or behind the binding apparatus 6, in particular to be tensioned and run to the drive apparatus 17 and/or to the deflecting apparatus 18.

A binding apparatus 6 used with the generic sporting device 1 is preferably a touring binding, by means of which a walking movement is made possible, in particular a relative turning movement of the sporting shoe 7 relative to the sliding body 2 when taking a step. In particular, the binding apparatus 6 defines a pivot axis extending transversely to the longitudinal direction of the sliding body 2 or sporting device 1, thereby enabling a pivoting relative movement between a sporting shoe 7 of the user and the sliding body 2 or sporting device 1.

There are different designs of such touring bindings. Firstly, a design is known where a shoe receiving element 27 is provided, which is articulatingly connected to a part of the binding apparatus 6 secured to the sliding body 2 by means of a connecting device 28.

Based on another design of touring binding, a connecting element 29 in the form of two pins engages in an articulating arrangement directly in the sporting shoe 7 or the sole of the sporting shoe 7 in the toe portion thereof, thereby establishing a pivoting connection between the sporting shoe 7 and connecting element 29.

Regardless of the respective design of the binding apparatus 6, it is of advantage if the second segment 15 is inserted between the sliding body 2 and the pivot or rotation axis formed by the connecting device 28 or connecting element 29. Accordingly, the belt 13 or its top segment 15 is preferably run or positioned underneath the pivot or rotation axis of the binding apparatus 6.

To enable the second segment 15 to be easily threaded through the gap 25, which gap 25 is disposed underneath the shoe support plane 26 and substantially formed by a slim passage, the cross-sectional dimensions of the latter are at least slightly bigger than the cross-sectional dimensions of the belt 13, and a third deflecting apparatus 31 may be provided in front of the binding apparatus 30 or in front of the binding mounting area and a fourth deflecting apparatus 33 is provided behind the binding apparatus 32 or behind the binding mounting area. The expressions in front of and behind the binding apparatus 6 refer to the usual direction of forward movement 22 of the sporting device 1. The third deflecting apparatus 31 and the fourth deflecting apparatus 33 may be provided in the form of deflection rollers 34, for example. In addition or as an alternative, it would also be conceivable for the third deflecting apparatus 31 and/or fourth deflecting apparatus 33 to be provided in the form of a slide guide 35, by means of which the belt 13 is guided. The aim is to ensure that the belt 13 runs as freely as possible and with as little friction as possible, in particular also smoothly through the gap 25 underneath the shoe support plane 26.

The gap 25 may be integrated either directly in the binding apparatus 6 or in a support construction 36 mounted underneath a fitted binding apparatus 6. Possible designs of the binding apparatus 6 and support construction 36 will be explained and described in more detail below.

The belt 13 is preferably provided in the form of an endless climbing aid 37 which prevents backsliding, for example a climbing skin. Such a climbing skin—in a manner known per se—has a plurality of uniformly oriented hairs or fibers which typically extend at an angle to a base material in order to prevent backsliding. Accordingly, such climbing skins afford as little sliding or frictional resistance as possible relative to the ground, in particular snow, in the direction of typical or intended forward movement. In this respect, it is also possible for an endless belt 13 to be provided as a base structure and a climbing aid 37 in the form of a climbing skin is applied to the belt 13, for example by means of an adhesive bond.

Furthermore, the belt 13 may be such that it can be closed in an annulus and opened as and when necessary by means of an activatable and deactivatable coupling device 38. Such a coupling device 38 may be provided in the form of mutually engaging claws, for example. A hinge-type design would also be conceivable. Alternatively, the annular belt 13 may have inseparably joined, in particular welded, belt ends 39. Similarly, it is also possible for the belt 13 to be made as a single piece, in particular produced as an annulus by injection casting. The way in which such an endless belt with inseparably joined belt ends 39 is fitted and removed will be explained in more detail below.

Furthermore, the drive apparatus 17 and/or the first deflecting apparatus 18 can be mounted on the sliding body 2 by means of a coupling device 40, 41 so that they can be fitted and removed as and when necessary. Such an option whereby the drive apparatus 17 and/or first deflecting apparatus 18 can be removed has a positive effect on the travel properties of the sliding body 2, in particular in travel mode. The possibility of being able to reduce the weight of items on the sliding body 2 in particular has a positive effect on the travel properties. To make it possible to remove the drive apparatus 17 and/or first deflecting apparatus 18, the coupling device 40, 41 may comprise a first coupling element 42 and a second coupling element 43 co-operating therewith. The second coupling element 43 in this instance is secured to the sliding body 2, in particular secured to the ski, whilst the first coupling element 42 is disposed on the drive apparatus 17 or deflecting apparatus 18 and forms a component unit with said parts. A coupling movement 44 between the first coupling element 42 and the second coupling element 43 ideally extends substantially in the longitudinal direction 16 of the sliding body 2 and is oriented respectively in the direction towards the longitudinal center 45 of the sliding body 2. End stops for this coupling movement 44 may define the desired or end positions relative to the sliding body 2.

The first coupling element 42 may be a bar with a rectangular cross-section, for example, which is pushed into a co-operating second coupling element 43 in the fort of a hollow section. The first coupling element 43 in this instance is fixedly connected to the first deflecting apparatus 18 and/or to the drive apparatus 17 and the second coupling element 43 is connected to or integrally formed with the sliding body 2.

As an alternative to the illustrated embodiment, it would also be possible for the first coupling element 42 to have a cross-section other than the one just described. Based on another embodiment, the first coupling element 42 may be designed so that it can be push-fitted directly on the sliding body 2, in which case no second coupling element 43 co-operating with the first coupling element 42 is needed.

In all of the embodiments, it is of advantage if a coupling movement 44 extends in the longitudinal direction 16 of the sliding body 2 as illustrated in FIG. 3, so that the drive apparatus 17 and/or the first deflecting apparatus 18 can be held in position by the pre-tensioning of the belt 13, enabling a practicable and functionally reliable design to be obtained.

A required pre-tensioning of the belt 13 can therefore be maintained by the sliding body 2, which acts like a spring due to its flexure or pre-tensioning, in particular due to its curvature or biasing height in the region of the binding mounting area and can thus tension the belt 13 and hold it tensioned. Furthermore, it is possible to provide a stop 47 on the first and/or on the second coupling element 42, 43, the position of which is variable, by means of which the drive apparatus 17 and/or the first deflecting apparatus 18 can be variably positioned relative to the sliding body 2, thereby enabling a required pre-tensioning to be varied and/or individually set.

Alternatively, as may be seen in FIG. 4, the drive apparatus 17 and/or the first deflecting apparatus 18 may be displaceable between an operating position 48 in which the belt 13 is tensioned and a non-operating position 49 in which the belt 13 is released, in particular by pivoting about an axis extending transversely to the longitudinal direction of the sliding body 2. As a result the weight of the drive apparatus 17 and/or first deflecting apparatus 18 can be moved in the direction towards the binding apparatus 6 or relatively towards the center so as to be closer to the sliding body 2, thereby improving the handling properties of the sliding body 2 in travel mode or travelling mode.

Based on one practical embodiment, the sliding body 2 is based on a so-called touring ski design in terms of its geometry and/or structure. It may be of particular advantage if the sliding body 2 or touring ski is a so-called "twin-tip ski" where the front and also the rear longitudinal end form a so-called ski shovel, in particular having an arcuate upwardly curved end section in each case. Such a ski construction or ski geometry, which is often also referred to as a "full rocker", may be of advantage above all because the drive apparatus 17 and the first deflecting apparatus 18 are in a raised position, in particular raised or spaced further away from the ground. Above all, this offers advantages with respect to the drive because, amongst other things, any accumulation of snow in the region where the belt 13 is deflected can be minimized or prevented.

FIG. 3 illustrates a perspective view of a drive apparatus 17 of the sporting device 1. As may be seen from FIG. 3, the drive apparatus 17 may comprise a drive roller 50 which is suitable for transmitting a torque applied by an electric motor 51 to the belt 13. To enable the torque applied by the electric motor 51 to be transmitted more efficiently to the belt 13, toothing 52 may be provided on an internal face 53 of the belt 13. This toothing 52 may mesh with co-operating toothing 54 of the drive roller 50. This enables a higher torque to be obtained compared with a design of belt 13 with a flat internal face 53 and a drive roller 50 with a smooth external contour. Notwithstanding the above, it would naturally also be possible to opt for such an embodiment with flat belt and flat pulley.

Furthermore, the drive roller 50 may be provided with a camber 55 on its circumferential external face, by means of which the centered or centrally oriented running of the belt 13 can be improved and the belt 13 can be prevented from slipping sideways. This camber 55 is advantageously such that the drive roller 50 has a slightly bigger diameter at its axial center than at its axial end faces.

Furthermore, the drive apparatus 17, in particular the region in which the belt 13 runs onto the drive roller 50, is housed. If snow gets between the belt 13 and drive roller 50, it is possible that the belt 13 will run askew due to the snow. Such a housing offers an advantage in that such skewing is prevented because the snow is kept as far as possible away from the drive roller 50. Such a housing might be provided in the form of cover plates made from plastic, for example.

Based on the embodiment illustrated in FIG. 3, it is possible to provide the electric motor 51 in the form of a wheel hub motor 56. This being the case, it is of advantage if a shaft 57 of the wheel hub motor 56 is mounted in an appropriate mounting fork 58 or is secured thereto. In particular, the shaft 57 of the wheel hub motor 56 is connected to the mounting fork 58 so as to rotate in unison with it. The mounting fork 58 may be directly connected to a first coupling element 42 of the coupling device 41. In the case of an embodiment using a wheel hub motor 56, it is of advantage if a hollow cylindrical rotor 59 of the wheel hub motor 56 disposed around the shaft 57 directly accommodates the drive roller 50. Furthermore, the rotor 59 of the wheel hub motor 56 may also serve directly as the drive roller 50 by means of its external circumference.

FIG. 5 is a perspective diagram illustrating a schematic model of a belt 13, in particular the bottom or first segment 14 which lies against the bottom side 3 of the sliding body 2 and runs along or slides relative to the latter. As may be seen from this diagram, the belt 13 may be provided with transverse webs 60 at least in certain regions of its internal face 53 directed towards the sliding body 2 or orifices 62 extending between its internal face 53 and an external face 61—FIG. 15. Such transverse webs 60 or orifices 62 may form toothing 52. It may be that the toothing 52 extends across the entire width 63 of the belt 13.

Based on another embodiment illustrated in FIG. 5 however, the belt 13 may have at least one web 65 on its internal face 53 extending in the belt longitudinal direction 64 in at least a certain region, which runs in a co-operating recess 66 in the sliding surface 4 of the sliding body 2 or locates positively in this recess 66. In the embodiment illustrated as an example in FIG. 5, the web 65 is simultaneously designed as toothing 52 but the toothing 52 does not extend across the entire width 63 of the belt 13. Instead, the web 65 illustrated in this instance extends across only a part-section 68 of the width 63 of the belt 13. In this instance, it is of advantage if the web 65 is disposed longitudinally at the center with respect to the belt 13.

Furthermore, it is of advantage if on the internal face 53 of the belt 13, at least two outwardly lying or outer segments 69, viewed relative to the width 63 of the belt 13, are provided in the form of friction-reducing sliding surfaces 70. These sliding surfaces 70 of the belt 13 are disposed opposite the sliding surface 4 of the sliding body 2 and are in contact with the latter when the sporting device 1 is in climbing mode. The friction-reducing sliding surfaces 70 may be provided in the form of plastic surfaces or by surfaces 70 on the internal face of the belt that are coated or lubricated, with a view to reducing or minimizing sliding friction or wear of the bottom side 3 of the sliding body 2 which is typically made from plastic, in particular polyethylene.

FIGS. 6 and 7 illustrate another and optionally independent embodiment of the drive apparatus 17, the same reference numbers and component names being used to denote parts that are the same as those used in connection with FIGS. 1 to 4 above. To avoid unnecessary repetition, reference may be made to the more detailed description of FIGS. 1 to 4 given above.

FIG. 6 shows the drive apparatus 17 in a perspective view and FIG. 7 is a diagram in section along section line VII-VII indicated in FIG. 6. The drive apparatus 17 illustrated in this instance is equipped with at least one retaining claw 46 so that it can be push-fitted directly on the sliding body 2 and secured to the latter without the need to provide a co-operating coupling device on the sliding body 2 for the at least one retaining claw 46. As a result, when the sliding body 2 is in travel mode, it is as free as possible of additional components.

As may be seen from FIG. 7, the drive apparatus 17 may comprise an electric motor 51 and optionally a reducing gear 71 coupled with the electric motor 51. Furthermore, the drive apparatus 17 may be based on a design without a shaft because a drive roller 50 of the drive apparatus 17 has a rotary bearing 73 on at least one axial end face 72, preferably on two axial end faces 72, and this rotary bearing 73 in the form of a rotating assembly makes this design without a shaft possible. Due to this rotary bearing 73 with its axis of rotation extending transversely to the longitudinal direction 16 substantially parallel with the bottom side 3 of the sliding body 2, the drive roller 50 can be connected to a bearing block 74 fixedly secured on the sliding body 2 so as to rotate. Due to such an embodiment, the drive roller 50 may be provided with as thin a wall as possible with a view to minimizing the weight of the drive roller 50. Due to this rotary bearing 73 in the form of a rotating assembly between the drive roller 50 and bearing block 74, a high degree of robustness and ability to withstand load can be achieved for a relatively low weight.

To make a further saving on weight, the rotary bearing 73 may be provided in the form of a sleeve bearing, for example. Alternatively, however, the rotary bearing 73 may be a roller bearing, such as a needle bearing. A diameter of this sleeve or roller bearing may expediently be only slightly smaller than the diameter of the drive roller 50. This brings advantages in terms of stability and smooth running. The bearing block 74 may simultaneously serve as a housing and/or mount for the retaining claws 46, in which case the drive apparatus 17 can be secured directly on the sliding body 2. Furthermore, the bearing block 74 may simultaneously serve as a mount or fixing option for the electric motor 51 and reducing gear 71.

As may also be seen from FIG. 7, the drive roller 50 is provided in the form of a thin-walled hollow cylinder 75 and the electric motor 51 and the optionally provided reducing gear 71 are disposed inside the hollow cylindrical drive roller 50.

Accordingly, the drive apparatus 17 can be built to as compact a design as possible enabling space to be saved and the electric motor 51 and reducing gear 71 are additionally protected from environmental influences. Based on one advantageous feature, the plate-type support elements of the bearing block 74 may serve as covers or cover plates on the axial end faces of the drive roller 50, which bound or close off the hollow cylindrical interior of the drive roller 50 from the ambient environment.

At least one fixing element 76 is provided on the bearing block 74, by means of which the electric motor 51 respectively the reducing gear 71 can be secured to the bearing block 74 and prevented from rotating. The at least one fixing element 76 may be provided in the form of retaining brackets or screws.

Furthermore, the drive roller 50 may have or is formed with a toothed rim 78 on its hollow cylindrical internal wall 77, by means of which the drive roller 50 can be driven by the electric motor 51 or interconnected reducing gear 71. This enables a robust and simple as well as weight-saving reducing gear 71' to be obtained between the electric motor 51 and drive roller 50, which may optionally make the provision of an additional reducing gear 71 unnecessary.

The features of the drive apparatus 17 just described mean that the electric motor 51 as well as the reducing gear 71 can be rigidly connected to the sliding body 2 via the bearing block 74. Consequently, the drive roller 50 can be actively driven in rotation by the electric motor 51 respectively the reducing gear 71 and hence the circulating belt 13.

As may be seen in FIG. 7, the electric motor 51 and the reducing gear 71 may be disposed in the following manner. The electric motor 51 is preferably mounted so that it is disposed inside the drive roller 50 and relatively close to the hollow cylindrical internal wall 77. The position of the electric motor 51 is preferably selected so that an axis 79 of the electric motor 51 extends parallel with an axis 80 of the drive roller 50. The reducing gear 71 may be disposed in the remaining space inside the drive roller 50. In this respect, it is of advantage if an axis 81 of the reducing gear 71 extends parallel with the axis 80 of the drive roller 50. The electric motor 51 and reducing gear 71 are therefore oriented axially parallel with one another and are accommodated as such inside the drive roller 50. In order to transmit the torque from the electric motor 51 to the reducing gear 71, at least one gear wheel 82 may be provided on the output side of the electric motor 51 and on the input side of the reducing gear 71. As an alternative to such a pair of gear wheels 82, a toothed belt drive may be provided as a means of transmitting the torque or some other torque-transmitting device may be provided between the electric motor 51 and reducing gear 71.

The reducing gear 71 may be a planetary gear or a gear with spur toothing. On the output side of the reducing gear 71, a pinion 83 may be provided, which engages in the toothed rim 78 and thus transmits the torque applied by the electric motor 51 to the drive roller 50. Compared with the toothed rim 78, the pinion 83 is as small as possible so that as large as possible a reduction can be achieved, as explained above. As a result of this reduction between the pinion 83 and toothed rim 78, the required reduction in the reducing gear 71, if one is provided, can be reduced so that the latter may be of a smaller design.

FIG. 8 illustrates a first possible embodiment of a support construction 36, which is mounted on the top face 5 of the sliding body 2. This support construction 36 serves as a mount for the binding apparatus 6 and for supporting the load of at least the so-called toe-piece of the binding apparatus 6 and contains the gap 25 through which the belt 13, in particular the second segment 15, is threaded underneath the binding apparatus 6.

FIG. 9 illustrates another and optionally independent embodiment of the support construction 36, the same reference numbers and component names being used to denote parts that are the same as those described with reference to FIG. 8. To avoid unnecessary repetition, reference may be made to the more detailed description of FIG. 8 given above.

Not all the features and embodiments illustrated in FIG. 8 and FIG. 9 are necessarily provided as a structurally separate support construction 36 and instead it would also be conceivable for the features and functions to be directly integrated in the binding apparatus 6, in particular in its toe-piece or toe-end retaining element and/or in its heel-piece or heel-end retaining element.

The design of the support construction 36 and/or binding apparatus 6 very much depends on whether the belt 13 has a coupling device 38 or whether it is based on an endless welded or one-piece design. If the belt 13 is provided with a coupling device 38, it may be sufficient if the gap 25 is provided in the support construction 36 and the support construction 36 is a rigid element that cannot be removed and cannot be pivoted upwards.

To enable the belt 13 to be fitted on and removed from the sporting device 1, the coupling device 38 of the belt 13 is released so that the two belt ends 39 are separated from one another and the belt 13 can be threaded in the longitudinal direction 16 of the sliding body 2 into and out of the gap 25 of the support construction 36.

However, if an endless, welded or one-piece belt 13 is used, it is necessary for the support construction 36 to be provided with a mechanism whereby the belt 13 can be introduced into the gap 25 underneath the shoe support plane 26 and can be removed from it again. One possible embodiment of such a mechanism is described and illustrated with reference to FIGS. 8 and 9.

In the embodiment illustrated in FIG. 8, the support construction 36 comprises a top element 84 and a bottom element 85 which are connected to one another by means of an articulated joint 86, thereby forming a pivot axis 87. The pivot axis 87 advantageously extends parallel with the longitudinal direction 16 of the sliding body 2, in particular substantially axially parallel with the longitudinal axis of the sliding body 2. As a result, during a pivoting movement 88, the top element 84 on which the binding apparatus 6 and/or at least a front and/or rear component of the binding apparatus 6 is mounted is pivoted upwards relative to the bottom element 85 so that the belt 13, in particular the second segment 15 of the belt 13, can be effortlessly introduced into the gap 25. Once the belt 13 has been inserted, the top element 84 is pivoted back down or folded downwards. When the top element 84 is pivoted downwards, the top element 84, in particular the third deflecting apparatus 31 and/or the fourth deflecting apparatus 33 simultaneously serve as a tensioning device, as a result of which the belt 13 can be pre-tensioned or tautened. The pre-tensioning applied to the belt 13 by this downward pivoting movement is absorbed by the slight elastic deformation of the sliding body 2 and/or by the stiffness of the sliding body 2 and stored in the sliding body 2. Accordingly, the sliding body 2 serves as a spring for taking up the pre-tensioning force applied to the belt 13. This embodiment enables effortless and uncomplicated handling to be obtained because the support construction 36 may also serve as an operating aid or lever mechanism, which makes for easy fitting and smooth tensioning of the belt 13.

A fixing means 89, which might be provided in the form of a screw or catch or clip, can then be used to secure the support construction 36 in its closed position ready for operation once the top element 84 has been closed.

FIG. 9 illustrates the other embodiment of the support construction 36 in which the top element 84 and bottom element 85 are rigidly connected to one another by a lateral web 90. In this embodiment, the belt 13 can be introduced into the gap 25 through a side opening 91 lying opposite the lateral web 90. This side opening 91 or lateral insertion slot of the support construction 36 enables the belt 13 to be easily fitted on and removed from the sliding body 2. Furthermore, the component features needed for this are uncomplicated and robust.

In order to prevent the belt 13 from slipping sideways out of the gap 25 and impart sufficient stability or rigidity to the support construction 36, the support construction 36 may comprise a closure element 92 closing off the side opening 91. This closure element 92 is preferably pivotably mounted on the top element 84 so that it can be easily opened and closed again. In the active or closed state, the closure element 92 may also function as a support element for the top element 84, as schematically indicated in FIG. 9.

FIG. 10 is a perspective diagram illustrating a sporting device 1 or two sporting devices 1 on which a user 8 is standing. As may be seen from this diagram, the sporting device 1 is used as a pair and a first sporting device 1 is provided for the left foot of the user 8 and another sporting device 1 is provided for the right foot of the user 8. In particular, the sporting shoes 7 of the user 8 can be coupled with and uncoupled from the sporting devices 1 via the binding apparatuses 6 as and when necessary. As also illustrated in this diagram, the user 8 may carry a rucksack 93 in which the power supply source 19 is disposed, for example in the form of an electrochemical rechargeable battery, in particular a lead gel, nickel-cadmium (NiCd), nickel-metal hydride (NiMH) or lithium ion (Li-Ion) rechargeable battery. Alternatively or in combination with this, it would also be possible for the electrochemical energy storage or power supply sources 19 to be disposed in a hip belt or jacket of the user.

The drive apparatus 17 can be supplied with electrical energy by means of this power supply source 19. Furthermore, a regulating and/or control unit 94 may be interconnected between the power supply source 19 and drive apparatus 17, by means of which the drive apparatus 17 can be activated and controlled with an electrical energy supply.

The control unit 94 may comprise at least one digital input device 95, 95' or a potentiometer by means of which a rotation speed and hence a speed of movement and/or a cycle time and/or switching times of the drive apparatus 17 can be predefined or variably adjusted. The electrical driving energy for the drive apparatus 17 may be conditioned, set and adjusted by means of any control or regulating devices known from the prior art.

FIGS. 11, 12 illustrate side views of the sporting device 1. In the case of the diagram illustrated in FIG. 11, the binding apparatus 6 is in its base position in which the shoe support plane 26 is oriented substantially parallel with the sliding surface 4 of the sliding body 2 underneath the binding apparatus 6.

FIG. 12 shows a side view of the sporting device 1 from FIG. 11 but in this view the binding apparatus 6 is in its walking position or in an upwardly pivoted position and thus lies at a certain position of angular rotation 96 relative to the base position. The functional sequence involved in operating the sporting device 1 will be described below with reference to FIGS. 10, 11 and 12 in conjunction with one another.

Solely for the sake of completeness, it should be pointed out that instead of the illustrated binding apparatus 6 having an automatically pivoted heel fastener or heel retaining element, it would naturally also be possible to use a binding apparatus 6 where no such heel retaining element is provided or where the heel retaining element is fixedly mounted on the ski and does not therefore pivot.

Starting from a neutral position illustrated in FIG. 10, the user 8 takes a step forward with his right foot. As viewed in the direction of forward movement 22, the right foot of the user 8 is further forward than the left foot of the user 8. The user 8 then places his left foot forward. During this movement when the left foot is pushed from a position behind the right foot to a position in front of the right foot, the drive apparatus 17 of the sporting device 1 strapped to the left foot is activated via an input device 95 respectively 95' manually and/or by means of the control unit 94 on an automated or semi-automated basis. As a result, the belt 13 is driven and the sporting device 1 mounted on the left foot of the user 8 is thus moved in the direction of forward movement 22. Due to this active or motorized movement of the sporting device 1, the user 8 is assisted in his walking movement by the sporting device 1.

Based on one advantageous feature, the control unit 94 can be programmed so that the user 8 merely has to send a start pulse to the control unit 94 via the input device 95, 95', whereupon the sporting device 1 strapped to the left foot moves by a predefined distance depending on the step length of the user 8. Alternatively or in combination with this, the time during which the input device 95' is operated may determine the activation time of the drive apparatus 17 or ultimately the travel distance of the sporting device 1. Alternatively or in combination with this, a sensor-based and/or manually operated detection means 97, 97' may be provided in an appropriate position, in particular within gripping range of the user and/or in the region of the binding apparatus 6, and connected to the control unit 94. Activation and deactivation of the drive apparatus 17 may then be undertaken on this basis.

When the left foot of the user 8 is then pushed far enough in front of the right foot, the travelling movement of the sporting device 1 strapped to the left foot is halted. The user 8 can then move his right foot forward, and in the same way as described above, the drive apparatus 17 of the sporting device 1 mounted on the right foot is set in motion.

The input device 95' and/or the detection means 97 for starting the movement of a sporting device 1 may be provided in the form of a push button or a control lever, for example, which can be attached to a ski pole 98 or integrated in a ski pole 98. In this case, the control command is actively and deliberately given by the user.

Alternatively or in combination with this, the detection means 97' may be provided on the sporting device 1—as explained above—for example integrated in the binding apparatus 6, and this sensor-based detection means 97' is used to detect a physiologically induced state of motion of the user 8 during walking, as schematically illustrated in FIGS. 11, 12. This might be a predefined position of angular rotation 96 into which the binding apparatus 6 is pivoted during a step of the user 8.

Alternatively, a pressure sensor may be integrated in the binding apparatus 6 or in the support construction 36, which serves as a sensor-based detection means 97'. This being the case, the command to start the movement can be emitted when there is a change in the load exerted by the user 8 on the sporting device 1, for example. Furthermore, the pressure which has to be exerted on the binding apparatus 6 in order to activate the detection means 97' can be adjusted. As a result, the sporting device 1 can be configured for use by different users 8. The adjustable pressure on the binding apparatus 6 for activating the detection means 97' may be between 70% and 100%, preferably between 80% and 90%, of the body weight of the user. The pulse for starting the travelling movement can therefore also be emitted on the basis of the physiological sequence of the walking movement, in which case the user 8 does not consciously have to initiate the travelling movement.

Based on another solution, the detection means 97' comprises an acceleration sensor. Such an acceleration sensor is able to detect the acceleration acting on the binding apparatus 6, for example, and the travelling movement of the drive apparatus 17 is initiated on the basis of these measured values.

Based on another solution, the detection means 97' comprises a contactless distance measuring means. This distance measuring means may be provided as a means of measuring the distance of the binding apparatus 6 of the sporting device 1 strapped to the left foot from the binding apparatus 6 of the sporting device 1 strapped to the right foot and the drive apparatus 17 is controlled on the basis of the current step sequence in the walking movement of the user 8.

Based on another alternative, it would also be conceivable for a motion sensor to be integrated in the drive apparatus 17 or in the deflecting apparatus 18 of the belt 13. Due to such a motion sensor, a pulse for starting the forward movement or driving movement can be issued on the basis of an initial movement of the user.

FIG. 13 illustrates another example of an embodiment of a sporting device 1, in which the drive apparatus 17 is positioned directly or indirectly behind the binding apparatus 6. This enables the looping angle of the belt 13 around the drive apparatus 17 to be made bigger with the aid of deflection rollers 99.

FIG. 14 illustrates another und optionally independent embodiment of the sporting device 1, the same reference numbers and component names being used to denote parts that are the same as those described with reference to FIGS. 1 to 13 above. To avoid unnecessary repetition, reference may be made to the more detailed description of FIGS. 1 to 13 given above.

Based on the embodiment illustrated in FIG. 14, in addition to the drive apparatus 17 for the belt 13, a binding drive 100 is mounted on the sporting device 1, in particular on the binding apparatus 6 of the sporting device 1. The purpose of the binding drive 100 is to provide the user 8 with additional assistance with his/her walking movement. In particular, the binding apparatus 6 is actively pivoted into a position of angular rotation 96 by means of the binding drive 100. The binding drive 100 is therefore provided in the form of a pivot drive for the binding apparatus 6. As a result, the user 8 or at least his/her heel portion is actively lifted, thereby increasing his/her potential energy. The binding drive 100 may comprise an electric motor which can be coupled with the binding apparatus 6 via a reducing gear as and when necessary.

In addition, the binding drive 100 may be coupled via a freewheel 101 to another drive roller 102 for driving the belt 13. When the user 8 places his/her body weight on the binding apparatus 6 during the walking movement, pivoting it into a position of angular rotation 96 or into a specific raised position, the other drive roller 102 is activated and driven by the pivoting movement of the binding apparatus 6 from its upwardly pivoted position of angular rotation 96 into a base position so that the drive roller 102 drives the belt 13. As a result, the potential energy can be converted into motion for the forward movement of the sporting device 1. The freewheel, which is preferably integrated in the drive roller 102, is necessary so that the drive roller 102 is able to run freely with the belt 13 if necessary when the latter is driven by the drive apparatus 17.

FIGS. 15 and 16 illustrate another and optionally independent embodiment of the sporting device 1, same reference numbers and component names being used to denote parts that are the same as those described with reference to FIGS. 1 to 13 above. To avoid unnecessary repetition, reference may be made to the more detailed description of FIGS. 1 to 13 given above.

FIG. 15 illustrates a perspective view of a drive apparatus 17 comprising a drive roller 50 with external toothing 54. The toothing 54 may be such—as may be seen from FIG. 15—that it is disposed in only a middle portion 103 of the drive roller 50. The belt 13 driven by the drive apparatus 17 may have a plurality of orifices 62 provided and/or aligned on the longitudinal center of the belt 13 with which the toothing 54 of the drive roller 50 co-operates.

Furthermore, the orifices 62 are framed by or faced in at least certain regions with an eyelet 104. This increases the ability of the orifices 62 to withstand load. As may be seen from FIG. 15, it may be of advantage if the toothing 54 meshes in the orifices 62 and extends through the orifices 62 as the belt 13 circulates around the drive roller 50. The advantage of this is that a good positive connection can be established between the toothing 54 and orifices 62, thereby enabling a high degree of driving force to be transmitted. In addition, the toothing 54 and orifices 62 also serve as a lateral guide for the belt 13.

In order to improve lateral guidance and circulation of the belt 13, the individual teeth of the toothing 54 may have chamfers on the side and/or front and or rear faces, making it easier for a tooth to pass into an orifice 62.

An embodiment such as that described in connection with FIG. 15 has another advantage in that snow lying on the belt 13 or on its internal face 53 is forced outwards through the orifices 62. Snow is therefore not able to get between the toothing 54 and belt 13 and constantly accumulate there, where it could lead to malfunction of the drive apparatus 17. In particular, this prevents and avoids any gradual build-up of resistance in terms of deflecting and rolling the belt 13.

As illustrated in the view in section in FIG. 16, the eyelet 104 simultaneously serves as a lateral guide for the belt 13 because a part-region 105 of the eyelet 104 projecting out from the belt 13 or from its internal face 53 co-operates with a recess 66 disposed in the sliding body 2 or in its bottom side 3.

Alternatively or additionally, the eyelet 104 may have at least one web 106 which co-operates with the recess 66 provided in the sliding body 2 and this serves as a lateral guide with respect to the sliding body 2.

The sporting device 1 is especially suitable for alpine ski sports and cross country skiing, and makes it easier for the user 8 above all when travelling long distances and climbing.

The embodiments illustrated as examples represent possible variants of the sporting device 1, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of features from the different embodiments illustrated and described may be construed as independent inventive solutions or solutions proposed by the invention in their own right.

The objective underlying the independent inventive solutions may be found in the description.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

Above all the individual embodiments of the subject matter illustrated in FIGS. 1 to 16 constitute independent solutions proposed by the invention in their own right. The objectives and associated solutions proposed by the invention may be found in the detailed descriptions of these drawings.

For the sake of good order, finally, it should be pointed out that in order to provide a clearer understanding of the structure of the sporting device 1, it and its constituent parts are illustrated to a certain extent out of scale and/or on an enlarged scale and/or on a reduced scale.

| | List of reference numbers |
|---|---|
| 1 | Sporting device |
| 2 | Sliding body |
| 3 | Bottom side |
| 4 | Sliding surface |
| 5 | Top face |
| 6 | Binding apparatus |
| 7 | Sporting shoe |
| 8 | User |
| 9 | Length of the sliding body |
| 10 | Width of the sliding body |
| 11 | Projected surface |
| 12 | Ground |
| 13 | Belt |
| 14 | First segment |
| 15 | Second segment |
| 16 | Longitudinal direction of the sliding body |
| 17 | Drive apparatus |
| 18 | First deflecting apparatus |
| 19 | Power supply source |
| 20 | First longitudinal end |
| 21 | Second longitudinal end |
| 22 | Direction of forward movement |
| 23 | Rear end section |
| 24 | Front end section |
| 25 | Gap |
| 26 | Shoe support plane |
| 27 | Shoe receiving element |
| 28 | Connecting device |
| 29 | Connecting element |
| 30 | In front of the binding apparatus |
| 31 | Third deflecting apparatus |
| 32 | Behind the binding apparatus |
| 33 | Fourth deflecting apparatus |
| 34 | Deflection roller |
| 35 | Slide guide |
| 36 | Support construction |
| 37 | Climbing aid |
| 38 | Belt coupling device |
| 39 | Belt end |
| 40 | Coupling device |
| 41 | Coupling device |
| 42 | First coupling element |
| 43 | Second coupling element |
| 44 | Coupling movement |
| 45 | Longitudinal center of sliding body |
| 46 | Retaining claw |
| 47 | Stop |
| 48 | Operating position |
| 49 | Non-operating position |
| 50 | Drive roller |
| 51 | Electric motor |
| 52 | Toothing |
| 53 | Internal face |
| 54 | Co-operating toothing |
| 55 | Camber |
| 56 | Wheel hub motor |
| 57 | Shaft |
| 58 | Mounting fork |
| 59 | Rotor |
| 60 | Transverse webs |
| 61 | External face |
| 62 | Orifice |
| 63 | Width of the belt |
| 64 | Belt longitudinal direction |
| 65 | Web |
| 66 | Recess |
| 67 | Width of the web |
| 68 | Part-section |
| 69 | Segment |
| 70 | Friction-reducing sliding surface |
| 71, 71' | Reducing gear |
| 72 | End face |
| 73 | Rotary bearing |
| 74 | Bearing block |
| 75 | Hollow cylinder |
| 76 | Fixing element |
| 77 | Internal wall |
| 78 | Toothed rim |
| 79 | Electric motor axis |
| 80 | Drive roller axis |
| 81 | Gear axis |
| 82 | Gear wheel |
| 83 | Pinion |
| 84 | Top element |
| 85 | Bottom element |
| 86 | Articulated joint |
| 87 | Pivot axis |
| 88 | Pivoting movement |
| 89 | Fixing means |
| 90 | Lateral web |
| 91 | Side opening |
| 92 | Closure element |
| 93 | Rucksack |
| 94 | Control unit |
| 95, 95' | Input device |

-continued

| | List of reference numbers |
|---|---|
| 96 | Position of angular rotation |
| 97, 97' | Detection means |
| 98 | Ski pole |
| 99 | Deflection roller |
| 100 | Binding drive |
| 101 | Freewheel |
| 102 | Other drive roller |
| 103 | Middle portion |
| 104 | Eyelet |
| 105 | Part-region of eyelet |
| 106 | Web |

The invention claimed is:

1. Sporting device (1) in the form of a touring ski assembly, comprising a sliding body (2) on which a bottom side (3) is designed as a sliding surface (4), a binding apparatus (6) disposed on the top face (5) of the sliding body (2) for fastening to a sporting shoe (7) of a user (8) in such a way that the fastening is released as and when necessary, at least one circulating belt (13) as well as a drive apparatus (17) and at least one first deflecting apparatus (18) for the circulating belt (13), wherein the circulating belt (13) is disposed next to the bottom side (3) of the sliding body (2) in a first segment (14) and the circulating belt (13) is disposed next to the top face (5) of the sliding body (2) in a second segment (15), and at least the majority of the length (9) of the sliding body (2) is surrounded by the circulating belt (13) and the circulating belt (13) is moved by the drive apparatus (17) at least in a longitudinal direction (16) relative to the sliding body (2).

2. Sporting device according to claim 1, wherein the drive apparatus (17) is disposed at a first longitudinal end (20) of the sliding body (2) and the first deflecting apparatus (18) is disposed at the opposite, second longitudinal end (21) of the sliding body (2) so that the sliding body (2) is completely surrounded by the circulating belt (13) in terms of its length (9).

3. Sporting device according to claim 1, wherein the second segment (15) is inserted through a gap (25) underneath a shoe support plane (26) of the binding apparatus (6).

4. Sporting device according to claim 3, wherein the gap (25) is disposed between a connecting device (28) for establishing an articulated connection of the binding apparatus (6) to the sliding body (2) and top face (5) of the sliding body (2) or between connecting elements (29) for establishing an articulated connection of the sporting shoe (7) to the binding apparatus (6) and sliding body (2).

5. Sporting device according to claim 1, wherein the circulating belt (13) is provided as an endless climbing aid (37) which prevents backsliding, in particular a climbing skin, or a climbing aid (37) applied to a circulating belt (13) which prevents backsliding.

6. Sporting device according to claim 5, wherein the circulating belt (13) is closed in an annular shape and opened as and when necessary by means of an activatable and deactivatable coupling device (38).

7. Sporting device according to claim 5, wherein the circulating belt (13) is inseparably joined, in particular by belt ends (39) that are welded to one another.

8. Sporting device according to claim 1, wherein the drive apparatus (17) is disposed on a rear end section (23) of the sliding body (2) as viewed in the direction of forward movement (22) and the first deflecting apparatus (18) is disposed on the front end section (24) of the sliding body (2).

9. Sporting device according to claim 1, wherein at least one from the group consisting of the drive apparatus (17) and the first deflecting apparatus (18) are retained in such a way that they are mounted on and removed from the sliding body (2) by means of at least one coupling device (40, 41) as and when necessary.

10. Sporting device according to claim 9, wherein the at least one coupling device (40, 41) comprises a first coupling element (42) and a second coupling element (43) co-operating therewith and a coupling movement (44) between the first (42) and second coupling element (43) extends substantially in the longitudinal direction (16) of the sliding body (2) and is oriented in the direction towards the longitudinal center (45) of the sliding body (2).

11. Supporting device according to claim 1, wherein at least one from the group consisting of the drive apparatus (17) and the first deflecting apparatus (18) is moved, in particular pivoted, between an operating position (48) tensioning the circulating belt (13) when the sporting device is in climbing mode and a non-operating position (49) releasing the circulating belt (13) when the sliding body (2) is in travel mode.

12. Sporting device according to claim 1, wherein by reference to the longitudinal extension (9) of the sliding body (2), at least a third (31) and a fourth deflecting apparatus (33), in particular at least one slide guide (35) or deflection roller (34), are provided in front of (30) and behind (32) the binding apparatus (6), by means of which the second segment (15) of the circulating belt (13) is guided or deflected.

13. Sporting device according to claim 1, wherein the circulating belt (13) is provided with transverse webs (60) at least in certain regions of its internal face (53) or orifices (62) extending between its internal (53) and external face (61) to form toothing (52), which toothing (52) meshes with co-operating toothing (54) of a drive roller (50) of the drive apparatus (17).

14. Sporting device according to claim 1, wherein the circulating belt (13) has at least one web (65) in at least a certain region of its internal face (53) extending in the belt longitudinal direction (64), which runs in a co-operating recess (66) in the sliding surface (4) of the sliding body (2).

15. Sporting device according to claim 14, wherein the at least one web (65) comprises a plurality of mutually spaced transverse webs (60) which form toothing (52) to establish a meshing connection with a drive roller (50) of the drive apparatus (17).

16. Sporting device according to claim 14, wherein a width (67) of the web (65) extends across only a part-section (68) of the width (63) of the circulating belt (13) and, by reference to the width (63) of the circulating belt (13), at least the outer segments (69) are provided with sliding surfaces (70) on the internal face (53) of the circulating belt (13) which reduce friction with the sliding surface (4) of the sliding body (2).

17. Sporting device according to claim 1, wherein the drive apparatus (17) comprises an electric motor (51) and a reducing gear (71).

18. Sporting device according to claim 1, wherein the drive apparatus (17) is based on a design without a shaft because a drive roller (50) of the drive apparatus (17) has a rotary bearing (73) on at least one axial end face (72) by means of which the drive roller (50) is rotatably connected to a bearing block (74) secured to the sliding body (2).

19. Sporting device according to claim 18, wherein the drive roller (50) is provided in the form of a thin-walled hollow cylinder (75) and an electric motor (51) and a reducing gear (71) are disposed inside the hollow cylindrical drive roller (50).

20. Sporting device according to claim 19, wherein the drive roller (50) has a toothed rim (78) on its hollow cylindrical internal wall (77) by means of which the drive roller (50) is driven by means of the electric motor (51) or the interconnected reducing gear (71).

21. Sporting device according to claim 1, wherein the drive apparatus (17) comprises a wheel hub motor (56), the rotor (59) of which defines or accommodates the drive roller (50).

22. Sporting device according to claim 1, wherein a power supply source (19) is provided in the form of an electrochemical rechargeable battery, in particular a lead gel, nickel-cadmium (NiCd), nickel-metal hydride (NiMH) or lithium ion (Li-Ion) rechargeable battery, by means of which the drive apparatus (17) is supplied with electrical energy.

23. Sporting device according to claim 1, wherein an electrical control unit (94) is connected to the drive apparatus (17) and configured to control the drive apparatus (17), which control unit (94) comprises at least one digital input device (95, 95') or a potentiometer, by means of which a rotation speed and hence at least one from the group consisting of the associated speed of movement, a cycle time, and switching times of the drive apparatus (17) are predefined or are variably adjustable.

24. Sporting device according to claim 23, wherein the control unit (94) is connected to at least one detection means (97), for example a switch contact or an electrical sensor, in order to detect an activation command for the drive apparatus (17).

25. Sporting device according to claim 24, wherein the at least one detection means (97) is configured to detect a control command actively or consciously initiated by a user (8) or to detect a state of motion induced by the physiological motion sequence, for example a predefined position of angular rotation (96) of the binding apparatus (6) relative to the sliding body (2) or a pressure load relative to the sliding body (2), and the drive apparatus (17) is activated as a function of the states detected by the at least one detection means (97).

26. Sporting device according to claim 25, wherein the detection means (97) is provided in the form of an acceleration sensor, in which case a movement of the user (8) is detected by the acceleration sensor and the drive apparatus (17) is activated on the basis of the detected states.

27. Sporting device according to claim 1, wherein the binding apparatus (6) comprises a binding drive (100) by means of which the binding apparatus (6) is actively pivoted into an upwardly pivoted position of angular rotation (96) relative to the sliding body (2).

* * * * *